(12) United States Patent
Scapa et al.

(10) Patent No.: US 9,574,717 B2
(45) Date of Patent: Feb. 21, 2017

(54) LED-BASED LIGHT WITH ADDRESSED LEDS

(71) Applicant: iLumisys, Inc., Troy, MI (US)

(72) Inventors: James R. Scapa, West Bloomfield, MI (US); John Ivey, Farmington Hills, MI (US); James M. Amrine, Jr., Ann Arbor, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

(21) Appl. No.: 14/598,375

(22) Filed: Jan. 16, 2015

(65) Prior Publication Data

US 2015/0204487 A1 Jul. 23, 2015

Related U.S. Application Data

(60) Provisional application No. 61/930,170, filed on Jan. 22, 2014.

(51) Int. Cl.
*F21S 4/00* (2016.01)
*F21V 23/02* (2006.01)
(Continued)

(52) U.S. Cl.
CPC ............ *F21K 9/175* (2013.01); *F21K 9/27* (2016.08); *F21S 10/023* (2013.01);
(Continued)

(58) Field of Classification Search
CPC .......... F21K 9/17; F21K 9/175; F21S 10/023; F21V 23/006–23/009; H05B 33/0842; H05B 33/0845; H05B 33/0857
See application file for complete search history.

(56) References Cited

U.S. PATENT DOCUMENTS

| D54,511 S | 2/1920 | Owen |
| D58,105 S | 6/1921 | Poritz |
| D79,814 S | 11/1929 | Hoch |
| D80,419 S | 1/1930 | Kramer |

(Continued)

FOREIGN PATENT DOCUMENTS

| CN | 1584388 A | 2/2005 |
| CN | 2766345 Y | 3/2006 |

(Continued)

OTHER PUBLICATIONS

PLC-81756-AL "Fireball" Contemporary Pendant Light, [online], [retrieved on Feb. 27, 2009] Retrieved from the Arcadian Lighting Web Page using Internet <URL: http://www.arcadianlighting.com/plc-81756-al.html>.

(Continued)

*Primary Examiner* — Peggy Neils
*Assistant Examiner* — Alexander Garlen
(74) *Attorney, Agent, or Firm* — Fish & Richardson P.C.

(57) ABSTRACT

An LED-based replacement light comprises multiple LEDs, the LEDs having different logical control addresses associated among them, with each logical control address subjecting one or more of the LEDs associated therewith to individual control; a controller in communication with the LEDs, the controller configured to generate signals that individually control the operating states of the one or more LEDs associated with each logical control address; a housing for the LEDs; and a connector disposed at an end of the housing, the connector shaped for connection with a light socket.

20 Claims, 6 Drawing Sheets

(51) Int. Cl.
*F21K 99/00* (2016.01)
*H05B 33/08* (2006.01)
*F21V 23/00* (2015.01)
*F21S 10/02* (2006.01)
*F21Y 101/00* (2016.01)

(52) U.S. Cl.
CPC ....... *F21V 23/006* (2013.01); *H05B 33/0803* (2013.01); *H05B 33/0842* (2013.01); *H05B 33/0845* (2013.01); *H05B 33/0857* (2013.01); *F21Y 2101/00* (2013.01); *F21Y 2103/10* (2016.08); *F21Y 2115/10* (2016.08); *Y02B 20/383* (2013.01)

(56) References Cited

U.S. PATENT DOCUMENTS

| | | | |
|---|---|---|---|
| D84,763 | S | 7/1931 | Stange |
| D119,797 | S | 4/1940 | Winkler et al. |
| D125,312 | S | 2/1941 | Logan |
| 2,826,679 | A | 3/1958 | Rosenburg |
| 2,909,097 | A | 10/1959 | Alden et al. |
| 317,862 | A | 4/1965 | Paul et al. |
| 3,272,977 | A | 9/1966 | Holmes |
| 3,318,185 | A | 5/1967 | Kott |
| 3,561,719 | A | 2/1971 | Grindle |
| 3,586,936 | A | 6/1971 | Mcleroy |
| 3,601,621 | A | 8/1971 | Ritchie |
| 3,612,855 | A | 10/1971 | Juhnke |
| 3,643,088 | A | 2/1972 | Osteen et al. |
| 3,739,336 | A | 6/1973 | Burland |
| 3,746,918 | A | 7/1973 | Drucker et al. |
| 3,818,216 | A | 6/1974 | Larraburu |
| 3,832,503 | A | 8/1974 | Crane |
| 3,858,086 | A | 12/1974 | Anderson et al. |
| 3,909,670 | A | 9/1975 | Wakamatsu et al. |
| 3,924,120 | A | 12/1975 | Cox, III |
| 3,958,885 | A | 5/1976 | Stockinger et al. |
| 3,969,720 | A | 7/1976 | Nishino |
| 3,974,637 | A | 8/1976 | Bergey et al. |
| 3,993,386 | A | 11/1976 | Rowe |
| 4,001,571 | A | 1/1977 | Martin |
| 4,054,814 | A | 10/1977 | Fegley et al. |
| 4,070,568 | A | 1/1978 | Gala |
| 4,082,395 | A | 4/1978 | Donato et al. |
| 4,096,349 | A | 6/1978 | Donato |
| 4,102,558 | A | 7/1978 | Krachman |
| 4,107,581 | A | 8/1978 | Abernethy |
| 4,189,663 | A | 2/1980 | Schmutzer et al. |
| 4,211,955 | A | 7/1980 | Ray |
| 4,241,295 | A | 12/1980 | Williams, Jr. |
| 4,261,029 | A | 4/1981 | Mousset |
| 4,262,255 | A | 4/1981 | Kokei et al. |
| 4,271,408 | A | 6/1981 | Teshima et al. |
| 4,271,458 | A | 6/1981 | George, Jr. |
| 4,272,689 | A | 6/1981 | Crosby et al. |
| 4,273,999 | A | 6/1981 | Pierpoint |
| 4,298,869 | A | 11/1981 | Okuno |
| 4,329,625 | A | 5/1982 | Nishizawa et al. |
| 4,339,788 | A | 7/1982 | White et al. |
| 4,342,947 | A | 8/1982 | Bloyd |
| 4,344,117 | A | 8/1982 | Niccum |
| 4,367,464 | A | 1/1983 | Kurahashi et al. |
| D268,134 | S | 3/1983 | Zurcher |
| 4,382,272 | A | 5/1983 | Quella et al. |
| 4,388,567 | A | 6/1983 | Yamazaki et al. |
| 4,388,589 | A | 6/1983 | Molldrem, Jr. |
| 4,392,187 | A | 7/1983 | Bornhorst |
| 4,394,719 | A | 7/1983 | Moberg |
| 4,420,711 | A | 12/1983 | Takahashi et al. |
| 4,455,562 | A | 6/1984 | Dolan et al. |
| 4,500,796 | A | 2/1985 | Quin |
| 4,521,835 | A | 6/1985 | Meggs et al. |
| 4,531,114 | A | 7/1985 | Topol et al. |
| 4,581,687 | A | 4/1986 | Nakanishi |
| 4,587,459 | A | 5/1986 | Blake |
| 4,597,033 | A | 6/1986 | Meggs et al. |
| 4,600,972 | A | 7/1986 | MacIntyre |
| 4,607,317 | A | 8/1986 | Lin |
| 4,622,881 | A | 11/1986 | Rand |
| 4,625,152 | A | 11/1986 | Nakai |
| 4,635,052 | A | 1/1987 | Aoike et al. |
| 4,647,217 | A | 3/1987 | Havel |
| 4,650,971 | A | 3/1987 | Manecci et al. |
| 4,656,398 | A | 4/1987 | Michael et al. |
| 4,661,890 | A | 4/1987 | Watanabe et al. |
| 4,668,895 | A | 5/1987 | Schneiter |
| 4,669,033 | A | 5/1987 | Lee |
| 4,675,575 | A | 6/1987 | Smith et al. |
| 4,682,079 | A | 7/1987 | Sanders et al. |
| 4,686,425 | A | 8/1987 | Havel |
| 4,687,340 | A | 8/1987 | Havel |
| 4,688,154 | A | 8/1987 | Nilssen |
| 4,688,869 | A | 8/1987 | Kelly |
| 4,695,769 | A | 9/1987 | Schweickardt |
| 4,698,730 | A | 10/1987 | Sakai et al. |
| 4,701,669 | A | 10/1987 | Head et al. |
| 4,705,406 | A | 11/1987 | Havel |
| 4,707,141 | A | 11/1987 | Havel |
| D293,723 | S | 1/1988 | Buttner |
| 4,727,289 | A | 2/1988 | Uchida |
| 4,739,454 | A | 4/1988 | Federgreen |
| 4,740,882 | A | 4/1988 | Miller |
| 4,748,545 | A | 5/1988 | Schmitt |
| 4,753,148 | A | 6/1988 | Johnson |
| 4,758,173 | A | 7/1988 | Northrop |
| 4,765,708 | A | 8/1988 | Becker et al. |
| 4,771,274 | A | 9/1988 | Havel |
| 4,780,621 | A | 10/1988 | Bartleucci et al. |
| 4,794,373 | A | 12/1988 | Harrison |
| 4,794,383 | A | 12/1988 | Havel |
| 4,801,928 | A | 1/1989 | Minter |
| 4,810,937 | A | 3/1989 | Havel |
| 4,818,072 | A | 4/1989 | Mohebban |
| 4,824,269 | A | 4/1989 | Havel |
| 4,837,565 | A | 6/1989 | White |
| 4,843,627 | A | 6/1989 | Stebbins |
| 4,845,481 | A | 7/1989 | Havel |
| 4,845,745 | A | 7/1989 | Havel |
| 4,847,536 | A | 7/1989 | Lowe et al. |
| 4,851,972 | A | 7/1989 | Altman |
| 4,854,701 | A | 8/1989 | Noll et al. |
| 4,857,801 | A | 8/1989 | Farrell |
| 4,863,223 | A | 9/1989 | Weissenbach et al. |
| 4,870,325 | A | 9/1989 | Kazar |
| 4,874,320 | A | 10/1989 | Freed et al. |
| 4,887,074 | A | 12/1989 | Simon et al. |
| 4,894,832 | A | 1/1990 | Colak |
| 4,901,207 | A | 2/1990 | Sato et al. |
| 4,904,988 | A | 2/1990 | Nesbit et al. |
| 4,912,371 | A | 3/1990 | Hamilton |
| 4,920,459 | A | 4/1990 | Rothwell, Jr. et al. |
| 4,922,154 | A | 5/1990 | Cacoub |
| 4,929,936 | A | 5/1990 | Friedman et al. |
| 4,934,852 | A | 6/1990 | Havel |
| 4,941,072 | A | 7/1990 | Yasumoto et al. |
| 4,943,900 | A | 7/1990 | Gartner |
| 4,962,687 | A | 10/1990 | Belliveau et al. |
| 4,965,561 | A | 10/1990 | Havel |
| 4,973,835 | A | 11/1990 | Kurosu et al. |
| 4,977,351 | A | 12/1990 | Bavaro et al. |
| 4,979,081 | A | 12/1990 | Leach et al. |
| 4,979,180 | A | 12/1990 | Muncheryan |
| 4,980,806 | A | 12/1990 | Taylor et al. |
| 4,991,070 | A | 2/1991 | Stob |
| 4,992,704 | A | 2/1991 | Stinson |
| 5,003,227 | A | 3/1991 | Nilssen |
| 5,008,595 | A | 4/1991 | Kazar |
| 5,008,788 | A | 4/1991 | Palinkas |
| 5,010,459 | A | 4/1991 | Taylor et al. |
| 5,018,054 | A | 5/1991 | Ohashi et al. |
| 5,027,037 | A | 6/1991 | Wei |
| 5,027,262 | A | 6/1991 | Freed |
| 5,032,960 | A | 7/1991 | Katoh |

(56) References Cited

U.S. PATENT DOCUMENTS

| | | |
|---|---|---|
| 5,034,807 A | 7/1991 | Von Kohorn |
| 5,036,248 A | 7/1991 | McEwan et al. |
| 5,038,255 A | 8/1991 | Nishihashi et al. |
| 5,065,226 A | 11/1991 | Kluitmans et al. |
| 5,072,216 A | 12/1991 | Grange |
| 5,078,039 A | 1/1992 | Tulk et al. |
| 5,083,063 A | 1/1992 | Brooks |
| 5,088,013 A | 2/1992 | Revis |
| 5,089,748 A | 2/1992 | Ihms |
| 5,103,382 A | 4/1992 | Kondo et al. |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,136,483 A | 8/1992 | Schoniger et al. |
| 5,140,220 A | 8/1992 | Hasegawa |
| 5,142,199 A | 8/1992 | Elwell |
| 5,151,679 A | 9/1992 | Dimmick |
| 5,154,641 A | 10/1992 | McLaughlin |
| 5,161,879 A | 11/1992 | McDermott |
| 5,161,882 A | 11/1992 | Garrett |
| 5,164,715 A | 11/1992 | Kashiwabara et al. |
| 5,184,114 A | 2/1993 | Brown |
| 5,194,854 A | 3/1993 | Havel |
| 5,198,756 A | 3/1993 | Jenkins et al. |
| 5,209,560 A | 5/1993 | Taylor et al. |
| 5,220,250 A | 6/1993 | Szuba |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,281,961 A | 1/1994 | Elwell |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,303,124 A | 4/1994 | Wrobel |
| 5,307,295 A | 4/1994 | Taylor et al. |
| 5,321,593 A | 6/1994 | Moates |
| 5,323,226 A | 6/1994 | Schreder |
| 5,329,431 A | 7/1994 | Taylor et al. |
| 5,341,988 A | 8/1994 | Rein et al. |
| 5,344,068 A | 9/1994 | Haessig |
| 5,350,977 A | 9/1994 | Hamamoto et al. |
| 5,357,170 A | 10/1994 | Luchaco et al. |
| 5,365,411 A | 11/1994 | Rycroft et al. |
| 5,371,618 A | 12/1994 | Tai et al. |
| 5,374,876 A | 12/1994 | Horibata et al. |
| 5,375,043 A | 12/1994 | Tokunaga |
| D354,360 S | 1/1995 | Murata |
| 5,381,074 A | 1/1995 | Rudzewicz et al. |
| 5,388,357 A | 2/1995 | Malita |
| 5,402,702 A | 4/1995 | Hata |
| 5,404,094 A | 4/1995 | Green et al. |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,463,502 A | 10/1995 | Savage, Jr. |
| 5,465,144 A | 11/1995 | Parker et al. |
| 5,473,522 A | 12/1995 | Kriz et al. |
| 5,475,300 A | 12/1995 | Havel |
| 5,481,441 A | 1/1996 | Stevens |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,506,760 A | 4/1996 | Giebler et al. |
| 5,513,082 A | 4/1996 | Asano |
| 5,519,496 A | 5/1996 | Borgert et al. |
| 5,530,322 A | 6/1996 | Ference et al. |
| 5,539,628 A | 7/1996 | Seib |
| 5,544,809 A | 8/1996 | Keating et al. |
| 5,545,950 A | 8/1996 | Cho |
| 5,550,440 A | 8/1996 | Allison et al. |
| 5,559,681 A | 9/1996 | Duarte |
| 5,561,346 A | 10/1996 | Byrne |
| D376,030 S | 11/1996 | Cohen |
| 5,575,459 A | 11/1996 | Anderson |
| 5,575,554 A | 11/1996 | Guritz |
| 5,581,158 A | 12/1996 | Quazi |
| 5,592,051 A | 1/1997 | Korkala |
| 5,592,054 A | 1/1997 | Nerone et al. |
| 5,600,199 A | 2/1997 | Martin, Sr. et al. |
| 5,607,227 A | 3/1997 | Yasumoto et al. |
| 5,608,290 A | 3/1997 | Hutchisson et al. |
| 5,614,788 A | 3/1997 | Mullins et al. |
| 5,621,282 A | 4/1997 | Haskell |
| 5,621,603 A | 4/1997 | Adamec et al. |
| 5,621,662 A | 4/1997 | Humphries et al. |
| 5,622,423 A | 4/1997 | Lee |
| 5,633,629 A | 5/1997 | Hochstein |
| 5,634,711 A | 6/1997 | Kennedy et al. |
| 5,640,061 A | 6/1997 | Bornhorst et al. |
| 5,640,141 A | 6/1997 | Myllymaki |
| 5,642,129 A | 6/1997 | Zavracky et al. |
| 5,655,830 A | 8/1997 | Ruskouski |
| 5,656,935 A | 8/1997 | Havel |
| 5,661,374 A | 8/1997 | Cassidy et al. |
| 5,661,645 A | 8/1997 | Hochstein |
| 5,673,059 A | 9/1997 | Zavracky et al. |
| 5,682,103 A | 10/1997 | Burrell |
| 5,684,523 A | 11/1997 | Satoh et al. |
| 5,688,042 A | 11/1997 | Madadi et al. |
| 5,697,695 A | 12/1997 | Lin et al. |
| 5,699,243 A | 12/1997 | Eckel et al. |
| 5,701,058 A | 12/1997 | Roth |
| 5,712,650 A | 1/1998 | Barlow |
| 5,713,655 A | 2/1998 | Blackman |
| 5,721,471 A | 2/1998 | Begemann et al. |
| 5,725,148 A | 3/1998 | Hartman |
| 5,726,535 A | 3/1998 | Yan |
| 5,731,759 A | 3/1998 | Finucan |
| 5,734,590 A | 3/1998 | Tebbe |
| 5,751,118 A | 5/1998 | Mortimer |
| 5,752,766 A | 5/1998 | Bailey et al. |
| 5,765,940 A | 6/1998 | Levy et al. |
| 5,769,527 A | 6/1998 | Taylor et al. |
| 5,781,108 A | 7/1998 | Jacob et al. |
| 5,784,006 A | 7/1998 | Hochstein |
| 5,785,227 A | 7/1998 | Akiba |
| 5,790,329 A | 8/1998 | Klaus et al. |
| 5,803,579 A | 9/1998 | Turnbull et al. |
| 5,803,580 A | 9/1998 | Tseng |
| 5,803,729 A | 9/1998 | Tsimerman |
| 5,806,965 A | 9/1998 | Deese |
| 5,808,689 A | 9/1998 | Small |
| 5,810,463 A | 9/1998 | Kawahara et al. |
| 5,812,105 A | 9/1998 | Van de Ven |
| 5,813,751 A | 9/1998 | Shaffer |
| 5,813,753 A | 9/1998 | Vriens et al. |
| 5,821,695 A | 10/1998 | Vilanilam et al. |
| 5,825,051 A | 10/1998 | Bauer et al. |
| 5,828,178 A | 10/1998 | York et al. |
| 5,831,522 A | 11/1998 | Weed et al. |
| 5,836,676 A | 11/1998 | Ando et al. |
| 5,841,177 A | 11/1998 | Komoto et al. |
| 5,848,837 A | 12/1998 | Gustafson |
| 5,850,126 A | 12/1998 | Kanbar |
| 5,851,063 A | 12/1998 | Doughty et al. |

(56) References Cited

U.S. PATENT DOCUMENTS

| | | |
|---|---|---|
| 5,852,658 A | 12/1998 | Knight et al. |
| 5,854,542 A | 12/1998 | Forbes |
| RE36,030 E | 1/1999 | Nadeau |
| 5,859,508 A | 1/1999 | Ge et al. |
| 5,865,529 A | 2/1999 | Yan |
| 5,870,233 A | 2/1999 | Benz et al. |
| 5,890,794 A | 4/1999 | Abtahi et al. |
| 5,896,010 A | 4/1999 | Mikolajczak et al. |
| 5,904,415 A | 5/1999 | Robertson et al. |
| 5,907,742 A | 5/1999 | Johnson et al. |
| 5,909,378 A | 6/1999 | De Milleville |
| 5,912,653 A | 6/1999 | Fitch |
| 5,917,287 A | 6/1999 | Haederle et al. |
| 5,917,534 A | 6/1999 | Rajeswaran |
| 5,921,660 A | 7/1999 | Yu |
| 5,924,784 A | 7/1999 | Chliwnyj et al. |
| 5,927,845 A | 7/1999 | Gustafson et al. |
| 5,934,792 A | 8/1999 | Camarota |
| 5,936,599 A | 8/1999 | Reymond |
| 5,943,802 A | 8/1999 | Tijanic |
| 5,946,209 A | 8/1999 | Eckel et al. |
| 5,949,347 A | 9/1999 | Wu |
| 5,951,145 A | 9/1999 | Iwasaki et al. |
| 5,952,680 A | 9/1999 | Strite |
| 5,959,547 A | 9/1999 | Tubel et al. |
| 5,961,072 A | 10/1999 | Bodle |
| 5,962,989 A | 10/1999 | Baker |
| 5,962,992 A | 10/1999 | Huang et al. |
| 5,963,185 A | 10/1999 | Havel |
| 5,966,069 A | 10/1999 | Zmurk et al. |
| 5,971,597 A | 10/1999 | Baldwin et al. |
| 5,973,594 A | 10/1999 | Baldwin et al. |
| 5,974,553 A | 10/1999 | Gandar |
| 5,980,064 A | 11/1999 | Metroyanis |
| 5,998,925 A | 12/1999 | Shimizu et al. |
| 5,998,928 A | 12/1999 | Hipp |
| 6,000,807 A | 12/1999 | Moreland |
| 6,007,209 A | 12/1999 | Pelka |
| 6,008,783 A | 12/1999 | Kitagawa et al. |
| 6,010,228 A | 1/2000 | Blackman et al. |
| 6,011,691 A | 1/2000 | Schreffler |
| 6,016,038 A | 1/2000 | Mueller et al. |
| 6,018,237 A | 1/2000 | Havel |
| 6,019,493 A | 2/2000 | Kuo et al. |
| 6,020,825 A | 2/2000 | Chansky et al. |
| 6,025,550 A | 2/2000 | Kato |
| 6,028,694 A | 2/2000 | Schmidt |
| 6,030,099 A | 2/2000 | McDermott |
| 6,031,343 A | 2/2000 | Recknagel et al. |
| D422,737 S | 4/2000 | Orozco |
| 6,056,420 A | 5/2000 | Wilson et al. |
| 6,068,383 A | 5/2000 | Robertson et al. |
| 6,069,597 A | 5/2000 | Hansen |
| 6,072,280 A | 6/2000 | Allen |
| 6,074,074 A | 6/2000 | Marcus |
| 6,084,359 A | 7/2000 | Hetzel et al. |
| 6,086,220 A | 7/2000 | Lash et al. |
| 6,091,200 A | 7/2000 | Lenz |
| 6,092,915 A | 7/2000 | Rensch |
| 6,095,661 A | 8/2000 | Lebens et al. |
| 6,097,352 A | 8/2000 | Zavracky et al. |
| 6,107,755 A | 8/2000 | Katyl et al. |
| 6,116,748 A | 9/2000 | George |
| 6,121,875 A | 9/2000 | Hamm et al. |
| 6,127,783 A | 10/2000 | Pashley et al. |
| 6,132,072 A | 10/2000 | Turnbull et al. |
| 6,135,604 A | 10/2000 | Lin |
| 6,135,620 A | 10/2000 | Marsh |
| 6,139,174 A | 10/2000 | Butterworth |
| 6,149,283 A | 11/2000 | Conway et al. |
| 6,150,774 A | 11/2000 | Mueller et al. |
| 6,151,529 A | 11/2000 | Batko |
| 6,153,985 A | 11/2000 | Grossman |
| 6,158,882 A | 12/2000 | Bischoff, Jr. |
| 6,166,496 A | 12/2000 | Lys et al. |
| 6,175,201 B1 | 1/2001 | Sid |
| 6,175,220 B1 | 1/2001 | Billig et al. |
| 6,181,126 B1 | 1/2001 | Havel |
| D437,947 S | 2/2001 | Huang |
| 6,183,086 B1 | 2/2001 | Neubert |
| 6,183,104 B1 | 2/2001 | Ferrara |
| 6,184,628 B1 | 2/2001 | Ruthenberg |
| 6,196,471 B1 | 3/2001 | Ruthenberg |
| 6,203,180 B1 | 3/2001 | Fleischmann |
| 6,211,626 B1 | 4/2001 | Lys et al. |
| 6,215,409 B1 | 4/2001 | Blach |
| 6,217,190 B1 | 4/2001 | Altman et al. |
| 6,219,239 B1 | 4/2001 | Mellberg et al. |
| 6,220,722 B1 | 4/2001 | Begemann |
| 6,227,679 B1 | 5/2001 | Zhang et al. |
| 6,236,331 B1 | 5/2001 | Dussureault |
| 6,238,075 B1 | 5/2001 | Dealey, Jr. et al. |
| 6,241,359 B1 | 6/2001 | Lin |
| 6,249,221 B1 | 6/2001 | Reed |
| 6,250,774 B1 | 6/2001 | Begemann et al. |
| 6,252,350 B1 | 6/2001 | Alvarez |
| 6,252,358 B1 | 6/2001 | Xydis et al. |
| 6,268,600 B1 | 7/2001 | Nakamura et al. |
| 6,273,338 B1 | 8/2001 | White |
| 6,275,397 B1 | 8/2001 | McClain |
| 6,283,612 B1 | 9/2001 | Hunter |
| 6,290,140 B1 | 9/2001 | Pesko et al. |
| 6,292,901 B1 | 9/2001 | Lys et al. |
| 6,293,684 B1 | 9/2001 | Riblett |
| 6,297,724 B1 | 10/2001 | Bryans et al. |
| 6,305,109 B1 | 10/2001 | Lee |
| 6,305,821 B1 | 10/2001 | Hsieh et al. |
| 6,307,331 B1 | 10/2001 | Bonasia et al. |
| 6,310,590 B1 | 10/2001 | Havel |
| 6,315,429 B1 | 11/2001 | Grandolfo |
| 6,323,832 B1 | 11/2001 | Nishizawa et al. |
| 6,325,651 B1 | 12/2001 | Nishihara et al. |
| 6,334,699 B1 | 1/2002 | Gladnick |
| 6,340,868 B1 | 1/2002 | Lys et al. |
| 6,354,714 B1 | 3/2002 | Rhodes |
| 6,361,186 B1 | 3/2002 | Slayden |
| 6,362,578 B1 | 3/2002 | Swanson et al. |
| 6,369,525 B1 | 4/2002 | Chang et al. |
| 6,371,637 B1 | 4/2002 | Atchinson et al. |
| 6,373,733 B1 | 4/2002 | Wu et al. |
| 6,379,022 B1 | 4/2002 | Amerson et al. |
| D457,667 S | 5/2002 | Piepgras et al. |
| D457,669 S | 5/2002 | Piepgras et al. |
| D457,974 S | 5/2002 | Piepgras et al. |
| 6,388,393 B1 | 5/2002 | Illingworth |
| 6,388,396 B1 | 5/2002 | Katyl et al. |
| 6,394,623 B1 | 5/2002 | Tsui |
| 6,396,216 B1 | 5/2002 | Noone et al. |
| D458,395 S | 6/2002 | Piepgras et al. |
| 6,400,096 B1 | 6/2002 | Wells et al. |
| 6,404,131 B1 | 6/2002 | Kawano et al. |
| 6,411,022 B1 | 6/2002 | Machida |
| 6,411,045 B1 | 6/2002 | Nerone |
| 6,422,716 B2 | 7/2002 | Henrici et al. |
| 6,428,189 B1 | 8/2002 | Hochstein |
| 6,429,604 B1 | 8/2002 | Chang |
| D463,610 S | 9/2002 | Piepgras et al. |
| 6,445,139 B1 | 9/2002 | Marshall et al. |
| 6,448,550 B1 | 9/2002 | Nishimura |
| 6,448,716 B1 | 9/2002 | Hutchison |
| 6,459,919 B1 | 10/2002 | Lys et al. |
| 6,464,373 B1 | 10/2002 | Petrick |
| 6,469,457 B2 | 10/2002 | Callahan |
| 6,471,388 B1 | 10/2002 | Marsh |
| 6,472,823 B2 | 10/2002 | Yen |
| 6,473,002 B1 | 10/2002 | Hutchison |
| D468,035 S | 12/2002 | Blanc et al. |
| 6,488,392 B1 | 12/2002 | Lu |
| 6,495,964 B1 | 12/2002 | Muthu et al. |
| 6,511,204 B2 | 1/2003 | Emmel et al. |
| 6,517,218 B2 | 2/2003 | Hochstein |
| 6,521,879 B1 | 2/2003 | Rand et al. |
| 6,522,078 B1 | 2/2003 | Okamoto et al. |
| 6,527,411 B1 | 3/2003 | Sayers |

(56) References Cited

U.S. PATENT DOCUMENTS

| | | |
|---|---|---|
| 6,528,954 B1 | 3/2003 | Lys et al. |
| 6,528,958 B2 | 3/2003 | Hulshof et al. |
| 6,538,375 B1 | 3/2003 | Duggal et al. |
| 6,540,381 B1 | 4/2003 | Douglass, II |
| 6,541,800 B2 | 4/2003 | Barnett et al. |
| 6,548,967 B1 | 4/2003 | Dowling et al. |
| 6,568,834 B1 | 5/2003 | Scianna |
| 6,573,536 B1 | 6/2003 | Dry |
| 6,577,072 B2 | 6/2003 | Saito et al. |
| 6,577,080 B2 | 6/2003 | Lys et al. |
| 6,577,512 B2 | 6/2003 | Tripathi et al. |
| 6,577,794 B1 | 6/2003 | Currie et al. |
| 6,578,979 B2 | 6/2003 | Truttmann-Battig |
| 6,582,103 B1 | 6/2003 | Popovich et al. |
| 6,583,550 B2 | 6/2003 | Iwasa et al. |
| 6,583,573 B2 | 6/2003 | Bierman |
| D477,093 S | 7/2003 | Moriyama et al. |
| 6,585,393 B1 | 7/2003 | Brandes et al. |
| 6,586,890 B2 | 7/2003 | Min et al. |
| 6,587,049 B1 | 7/2003 | Thacker |
| 6,590,343 B2 | 7/2003 | Pederson |
| 6,592,238 B2 | 7/2003 | Cleaver et al. |
| 6,594,369 B1 | 7/2003 | Une |
| 6,596,977 B2 | 7/2003 | Muthu et al. |
| 6,598,996 B1 | 7/2003 | Lodhie |
| 6,608,453 B2 | 8/2003 | Morgan et al. |
| 6,608,614 B1 | 8/2003 | Johnson |
| 6,609,804 B2 | 8/2003 | Nolan et al. |
| 6,609,813 B1 | 8/2003 | Showers et al. |
| 6,612,712 B2 | 9/2003 | Nepil |
| 6,612,717 B2 | 9/2003 | Yen |
| 6,612,729 B1 | 9/2003 | Hoffman |
| 6,621,222 B1 | 9/2003 | Hong |
| 6,623,151 B2 | 9/2003 | Pederson |
| 6,624,597 B2 | 9/2003 | Dowling et al. |
| D481,484 S | 10/2003 | Cuevas et al. |
| 6,634,770 B2 | 10/2003 | Cao |
| 6,634,779 B2 | 10/2003 | Reed |
| 6,636,003 B2 | 10/2003 | Rahm et al. |
| 6,639,349 B1 | 10/2003 | Bahadur |
| 6,641,284 B2 | 11/2003 | Stopa et al. |
| 6,652,117 B2 | 11/2003 | Tsai |
| 6,659,622 B2 | 12/2003 | Katogi et al. |
| 6,660,935 B2 | 12/2003 | Southard et al. |
| 6,666,689 B1 | 12/2003 | Savage, Jr. |
| 6,667,623 B2 | 12/2003 | Bourgault et al. |
| 6,674,096 B2 | 1/2004 | Sommers |
| 6,676,284 B1 | 1/2004 | Wynne Willson |
| 6,679,621 B2 | 1/2004 | West et al. |
| 6,681,154 B2 | 1/2004 | Nierlich et al. |
| 6,682,205 B2 | 1/2004 | Lin |
| 6,683,419 B2 | 1/2004 | Kriparos |
| 6,700,136 B2 | 3/2004 | Guida |
| 6,712,486 B1 | 3/2004 | Popovich et al. |
| 6,717,376 B2 | 4/2004 | Lys et al. |
| 6,717,526 B2 | 4/2004 | Martineau et al. |
| 6,720,745 B2 | 4/2004 | Lys et al. |
| 6,726,348 B2 | 4/2004 | Gloisten |
| 6,736,328 B1 | 5/2004 | Takusagawa |
| 6,736,525 B2 | 5/2004 | Chin |
| 6,741,324 B1 | 5/2004 | Kim |
| D491,678 S | 6/2004 | Piepgras |
| D492,042 S | 6/2004 | Piepgras |
| 6,744,223 B2 | 6/2004 | Laflamme et al. |
| 6,748,299 B1 | 6/2004 | Motoyama |
| 6,762,562 B2 | 7/2004 | Leong |
| 6,768,047 B2 | 7/2004 | Chang et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,787,999 B2 | 9/2004 | Stimac et al. |
| 6,788,000 B2 | 9/2004 | Appelberg et al. |
| 6,788,011 B2 | 9/2004 | Mueller et al. |
| 6,791,840 B2 | 9/2004 | Chun |
| 6,796,680 B1 | 9/2004 | Showers et al. |
| 6,799,864 B2 | 10/2004 | Bohler et al. |
| 6,801,003 B2 | 10/2004 | Schanberger et al. |
| 6,803,732 B2 | 10/2004 | Kraus et al. |
| 6,806,659 B1 | 10/2004 | Mueller et al. |
| 6,812,970 B1 | 11/2004 | McBride |
| 6,814,470 B2 | 11/2004 | Rizkin et al. |
| 6,814,478 B2 | 11/2004 | Menke |
| 6,815,724 B2 | 11/2004 | Dry |
| 6,846,094 B2 | 1/2005 | Luk |
| 6,851,816 B2 | 2/2005 | Wu et al. |
| 6,851,832 B2 | 2/2005 | Tieszen |
| 6,853,150 B2 | 2/2005 | Clauberg et al. |
| 6,853,151 B2 | 2/2005 | Leong et al. |
| 6,853,563 B1 | 2/2005 | Yang et al. |
| 6,857,924 B2 | 2/2005 | Fu et al. |
| 6,860,628 B2 | 3/2005 | Robertson et al. |
| 6,866,401 B2 | 3/2005 | Sommers et al. |
| 6,869,204 B2 | 3/2005 | Morgan et al. |
| 6,871,981 B2 | 3/2005 | Alexanderson et al. |
| 6,874,924 B1 | 4/2005 | Hulse et al. |
| 6,879,883 B1 | 4/2005 | Motoyama |
| 6,882,111 B2 | 4/2005 | Kan et al. |
| 6,883,929 B2 | 4/2005 | Dowling |
| 6,883,934 B2 | 4/2005 | Kawakami et al. |
| 6,888,322 B2 | 5/2005 | Dowling et al. |
| 6,897,624 B2 | 5/2005 | Lys et al. |
| D506,274 S | 6/2005 | Moriyama et al. |
| 6,909,239 B2 | 6/2005 | Gauna |
| 6,909,921 B1 | 6/2005 | Bilger |
| 6,918,680 B2 | 7/2005 | Seeberger |
| 6,921,181 B2 | 7/2005 | Yen |
| 6,926,419 B2 | 8/2005 | An |
| 6,936,968 B2 | 8/2005 | Cross et al. |
| 6,936,978 B2 | 8/2005 | Morgan et al. |
| 6,940,230 B2 | 9/2005 | Myron et al. |
| 6,948,829 B2 | 9/2005 | Verdes et al. |
| 6,953,261 B1 | 10/2005 | Jiao et al. |
| 6,957,905 B1 | 10/2005 | Pritchard et al. |
| 6,963,175 B2 | 11/2005 | Archenhold et al. |
| 6,964,501 B2 | 11/2005 | Ryan |
| 6,965,197 B2 | 11/2005 | Tyan et al. |
| 6,965,205 B2 | 11/2005 | Piepgras et al. |
| 6,967,448 B2 | 11/2005 | Morgan et al. |
| 6,969,179 B2 | 11/2005 | Sloan et al. |
| 6,969,186 B2 | 11/2005 | Sonderegger et al. |
| 6,969,954 B2 | 11/2005 | Lys |
| 6,975,079 B2 | 12/2005 | Lys et al. |
| 6,979,097 B2 | 12/2005 | Elam et al. |
| 6,982,518 B2 | 1/2006 | Chou et al. |
| 6,995,681 B2 | 2/2006 | Pederson |
| 6,997,576 B1 | 2/2006 | Lodhie et al. |
| 6,999,318 B2 | 2/2006 | Newby |
| 7,004,603 B2 | 2/2006 | Knight |
| D518,218 S | 3/2006 | Roberge et al. |
| 7,008,079 B2 | 3/2006 | Smith |
| 7,014,336 B1 | 3/2006 | Ducharme et al. |
| 7,015,650 B2 | 3/2006 | McGrath |
| 7,018,063 B2 | 3/2006 | Michael et al. |
| 7,018,074 B2 | 3/2006 | Raby et al. |
| 7,021,799 B2 | 4/2006 | Mizuyoshi |
| 7,021,809 B2 | 4/2006 | Iwasa et al. |
| 7,024,256 B2 | 4/2006 | Krzyzanowski et al. |
| 7,029,145 B2 | 4/2006 | Frederick |
| 7,031,920 B2 | 4/2006 | Dowling et al. |
| 7,033,036 B2 | 4/2006 | Pederson |
| 7,038,398 B1 | 5/2006 | Lys et al. |
| 7,038,399 B2 | 5/2006 | Lys et al. |
| 7,042,172 B2 | 5/2006 | Dowling et al. |
| 7,048,423 B2 | 5/2006 | Stepanenko et al. |
| 7,049,761 B2 | 5/2006 | Timmermans et al. |
| 7,052,171 B1 | 5/2006 | Lefebvre et al. |
| 7,053,557 B2 | 5/2006 | Cross et al. |
| 7,064,498 B2 | 6/2006 | Dowling et al. |
| 7,064,674 B2 | 6/2006 | Pederson |
| 7,067,992 B2 | 6/2006 | Leong et al. |
| 7,077,978 B2 | 7/2006 | Setlur et al. |
| 7,080,927 B2 | 7/2006 | Feuerborn et al. |
| 7,086,747 B2 | 8/2006 | Nielson et al. |
| 7,088,014 B2 | 8/2006 | Nierlich et al. |

(56) References Cited

U.S. PATENT DOCUMENTS

| | | | |
|---|---|---|---|
| 7,088,904 | B2 | 8/2006 | Ryan, Jr. |
| 7,102,902 | B1 | 9/2006 | Brown et al. |
| 7,113,541 | B1 | 9/2006 | Lys et al. |
| 7,114,830 | B2 | 10/2006 | Robertson et al. |
| 7,114,834 | B2 | 10/2006 | Rivas et al. |
| 7,118,262 | B2 | 10/2006 | Negley |
| 7,119,503 | B2 | 10/2006 | Kemper |
| 7,120,560 | B2 | 10/2006 | Williams et al. |
| 7,121,679 | B2 | 10/2006 | Fujimoto |
| 7,122,976 | B1 | 10/2006 | Null et al. |
| 7,123,139 | B2 | 10/2006 | Sweeney |
| 7,128,442 | B2 | 10/2006 | Lee et al. |
| 7,128,454 | B2 | 10/2006 | Kim et al. |
| D532,532 | S | 11/2006 | Maxik |
| 7,132,635 | B2 | 11/2006 | Dowling |
| 7,132,785 | B2 | 11/2006 | Ducharme |
| 7,132,804 | B2 | 11/2006 | Lys et al. |
| 7,135,824 | B2 | 11/2006 | Lys et al. |
| 7,139,617 | B1 | 11/2006 | Morgan et al. |
| 7,144,135 | B2 | 12/2006 | Martin et al. |
| 7,153,002 | B2 | 12/2006 | Kim et al. |
| 7,161,311 | B2 | 1/2007 | Mueller et al. |
| 7,161,313 | B2 | 1/2007 | Piepgras et al. |
| 7,161,556 | B2 | 1/2007 | Morgan et al. |
| 7,164,110 | B2 | 1/2007 | Pitigoi-Aron et al. |
| 7,164,235 | B2 | 1/2007 | Ito et al. |
| 7,165,863 | B1 | 1/2007 | Thomas et al. |
| 7,165,866 | B2 | 1/2007 | Li |
| 7,167,777 | B2 | 1/2007 | Budike, Jr. |
| 7,168,843 | B2 | 1/2007 | Striebel |
| D536,468 | S | 2/2007 | Crosby |
| 7,178,941 | B2 | 2/2007 | Roberge et al. |
| 7,180,252 | B2 | 2/2007 | Lys et al. |
| D538,950 | S | 3/2007 | Maxik |
| D538,952 | S | 3/2007 | Maxik et al. |
| D538,962 | S | 3/2007 | Elliott |
| 7,186,003 | B2 | 3/2007 | Dowling et al. |
| 7,186,005 | B2 | 3/2007 | Hulse |
| 7,187,141 | B2 | 3/2007 | Mueller et al. |
| 7,190,126 | B1 | 3/2007 | Paton |
| 7,192,154 | B2 | 3/2007 | Becker |
| 7,198,387 | B1 | 4/2007 | Gloisten et al. |
| 7,201,491 | B2 | 4/2007 | Bayat et al. |
| 7,201,497 | B2 | 4/2007 | Weaver, Jr. et al. |
| 7,202,613 | B2 | 4/2007 | Morgan et al. |
| 7,204,615 | B2 | 4/2007 | Arik et al. |
| 7,204,622 | B2 | 4/2007 | Dowling et al. |
| 7,207,696 | B1 | 4/2007 | Lin |
| 7,210,818 | B2 | 5/2007 | Luk et al. |
| 7,210,957 | B2 | 5/2007 | Mrakovich et al. |
| 7,211,959 | B1 | 5/2007 | Chou |
| 7,213,934 | B2 | 5/2007 | Zarian et al. |
| 7,217,004 | B2 | 5/2007 | Park et al. |
| 7,217,012 | B2 | 5/2007 | Southard et al. |
| 7,217,022 | B2 | 5/2007 | Ruffin |
| 7,218,056 | B1 | 5/2007 | Harwood |
| 7,218,238 | B2 | 5/2007 | Right et al. |
| 7,220,015 | B2 | 5/2007 | Dowling |
| 7,220,018 | B2 | 5/2007 | Crabb et al. |
| 7,221,104 | B2 | 5/2007 | Lys et al. |
| 7,221,110 | B2 | 5/2007 | Sears et al. |
| 7,224,000 | B2 | 5/2007 | Aanegola et al. |
| 7,226,189 | B2 | 6/2007 | Lee et al. |
| 7,228,052 | B1 | 6/2007 | Lin |
| 7,228,190 | B2 | 6/2007 | Dowling et al. |
| 7,231,060 | B2 | 6/2007 | Dowling et al. |
| 7,233,115 | B2 | 6/2007 | Lys |
| 7,233,831 | B2 | 6/2007 | Blackwell |
| 7,236,366 | B2 | 6/2007 | Chen |
| 7,237,924 | B2 | 7/2007 | Martineau et al. |
| 7,237,925 | B2 | 7/2007 | Mayer et al. |
| 7,239,532 | B1 | 7/2007 | Hsu et al. |
| 7,241,038 | B2 | 7/2007 | Naniwa et al. |
| 7,242,152 | B2 | 7/2007 | Dowling et al. |
| 7,244,058 | B2 | 7/2007 | DiPenti et al. |
| 7,246,926 | B2 | 7/2007 | Harwood |
| 7,246,931 | B2 | 7/2007 | Hsieh et al. |
| 7,248,239 | B2 | 7/2007 | Dowling et al. |
| 7,249,269 | B1 | 7/2007 | Motoyama |
| 7,249,865 | B2 | 7/2007 | Robertson |
| D548,868 | S | 8/2007 | Roberge et al. |
| 7,252,408 | B2 | 8/2007 | Mazzochette et al. |
| 7,253,566 | B2 | 8/2007 | Lys et al. |
| 7,255,457 | B2 | 8/2007 | Ducharme et al. |
| 7,255,460 | B2 | 8/2007 | Lee |
| 7,256,554 | B2 | 8/2007 | Lys |
| 7,258,458 | B2 | 8/2007 | Mochiachvili et al. |
| 7,258,467 | B2 | 8/2007 | Saccomanno et al. |
| 7,259,528 | B2 | 8/2007 | Pilz |
| 7,262,439 | B2 | 8/2007 | Setlur et al. |
| 7,262,559 | B2 | 8/2007 | Tripathi et al. |
| D550,379 | S | 9/2007 | Hoshikawa et al. |
| 7,264,372 | B2 | 9/2007 | Maglica |
| 7,267,467 | B2 | 9/2007 | Wu et al. |
| 7,270,443 | B2 | 9/2007 | Kurtz et al. |
| 7,271,794 | B1 | 9/2007 | Cheng et al. |
| 7,273,300 | B2 | 9/2007 | Mrakovich |
| 7,274,045 | B2 | 9/2007 | Chandran et al. |
| 7,274,160 | B2 | 9/2007 | Mueller et al. |
| 7,274,183 | B1 | 9/2007 | Gu et al. |
| D553,267 | S | 10/2007 | Yuen |
| 7,285,801 | B2 | 10/2007 | Eliashevich et al. |
| 7,288,902 | B1 | 10/2007 | Melanson |
| 7,288,904 | B2 | 10/2007 | Numeroli et al. |
| 7,296,912 | B2 | 11/2007 | Beauchamp |
| 7,300,184 | B2 | 11/2007 | Ichikawa et al. |
| 7,300,192 | B2 | 11/2007 | Mueller et al. |
| D556,937 | S | 12/2007 | Ly |
| D557,854 | S | 12/2007 | Lewis |
| 7,303,300 | B2 | 12/2007 | Dowling et al. |
| 7,306,353 | B2 | 12/2007 | Popovich et al. |
| 7,307,391 | B2 | 12/2007 | Shan |
| 7,308,296 | B2 | 12/2007 | Lys et al. |
| 7,309,965 | B2 | 12/2007 | Dowling et al. |
| 7,318,658 | B2 | 1/2008 | Wang et al. |
| 7,319,244 | B2 | 1/2008 | Liu et al. |
| 7,319,246 | B2 | 1/2008 | Soules et al. |
| 7,321,191 | B2 | 1/2008 | Setlur et al. |
| 7,326,964 | B2 | 2/2008 | Lim et al. |
| 7,327,281 | B2 | 2/2008 | Hutchison |
| 7,329,024 | B2 | 2/2008 | Lynch et al. |
| 7,329,031 | B2 | 2/2008 | Liaw et al. |
| D563,589 | S | 3/2008 | Hariri et al. |
| 7,344,278 | B2 | 3/2008 | Paravantsos |
| 7,345,320 | B2 | 3/2008 | Dahm |
| 7,348,604 | B2 | 3/2008 | Matheson |
| 7,350,936 | B2 | 4/2008 | Ducharme et al. |
| 7,350,952 | B2 | 4/2008 | Nishigaki |
| 7,352,138 | B2 | 4/2008 | Lys et al. |
| 7,352,339 | B2 | 4/2008 | Morgan et al. |
| 7,353,071 | B2 | 4/2008 | Blackwell et al. |
| 7,358,679 | B2 | 4/2008 | Lys et al. |
| 7,358,929 | B2 | 4/2008 | Mueller et al. |
| 7,370,986 | B2 | 5/2008 | Chan |
| 7,374,327 | B2 | 5/2008 | Schexnaider |
| 7,378,805 | B2 | 5/2008 | Oh et al. |
| 7,378,976 | B1 | 5/2008 | Paterno |
| 7,385,359 | B2 | 6/2008 | Dowling et al. |
| 7,391,159 | B2 | 6/2008 | Harwood |
| D574,093 | S | 7/2008 | Kitagawa et al. |
| 7,396,142 | B2 | 7/2008 | Laizure, Jr. et al. |
| 7,396,146 | B2 | 7/2008 | Wang |
| 7,401,935 | B2 | 7/2008 | VanderSchuit |
| 7,401,945 | B2 | 7/2008 | Zhang |
| D576,749 | S | 9/2008 | Kitagawa et al. |
| 7,423,548 | B2 | 9/2008 | Kontovich |
| 7,427,840 | B2 | 9/2008 | Morgan et al. |
| 7,429,117 | B2 | 9/2008 | Pohlert et al. |
| 7,434,964 | B1 | 10/2008 | Zheng et al. |
| 7,438,441 | B2 | 10/2008 | Sun et al. |
| D580,089 | S | 11/2008 | Ly et al. |
| D581,556 | S | 11/2008 | To et al. |
| 7,449,847 | B2 | 11/2008 | Schanberger et al. |
| D582,577 | S | 12/2008 | Yuen |

(56) References Cited

U.S. PATENT DOCUMENTS

| | | |
|---|---|---|
| 7,466,082 B1 | 12/2008 | Snyder et al. |
| 7,470,046 B2 | 12/2008 | Kao et al. |
| D584,428 S | 1/2009 | Li et al. |
| D584,429 S | 1/2009 | Pei et al. |
| 7,476,002 B2 | 1/2009 | Wolf et al. |
| 7,476,004 B2 | 1/2009 | Chan |
| 7,478,924 B2 | 1/2009 | Robertson |
| 7,482,764 B2 | 1/2009 | Morgan et al. |
| D586,484 S | 2/2009 | Liu et al. |
| D586,928 S | 2/2009 | Liu et al. |
| 7,490,957 B2 | 2/2009 | Leong et al. |
| 7,494,246 B2 | 2/2009 | Harbers et al. |
| 7,497,596 B2 | 3/2009 | Ge |
| 7,498,753 B2 | 3/2009 | McAvoy et al. |
| 7,507,001 B2 | 3/2009 | Kit |
| 7,510,299 B2 | 3/2009 | Timmermans et al. |
| 7,510,400 B2 | 3/2009 | Glovatsky et al. |
| 7,511,613 B2 | 3/2009 | Wang |
| 7,514,876 B2 | 4/2009 | Roach, Jr. |
| 7,520,635 B2 | 4/2009 | Wolf et al. |
| 7,521,872 B2 | 4/2009 | Bruning |
| 7,524,089 B2 | 4/2009 | Park |
| D592,766 S | 5/2009 | Zhu et al. |
| D593,223 S | 5/2009 | Komar |
| 7,530,701 B2 | 5/2009 | Chan-Wing |
| 7,534,002 B2 | 5/2009 | Yamaguchi et al. |
| D594,999 S | 6/2009 | Uchida et al. |
| 7,549,769 B2 | 6/2009 | Kim et al. |
| 7,556,396 B2 | 7/2009 | Kuo et al. |
| 7,559,663 B2 | 7/2009 | Wong et al. |
| 7,562,998 B1 | 7/2009 | Yen |
| D597,686 S | 8/2009 | Noh |
| 7,569,981 B1 | 8/2009 | Ciancanelli |
| 7,572,030 B2 | 8/2009 | Booth et al. |
| 7,575,339 B2 | 8/2009 | Hung |
| 7,579,786 B2 | 8/2009 | Soos |
| 7,583,035 B2 | 9/2009 | Shteynberg et al. |
| 7,583,901 B2 | 9/2009 | Nakagawa et al. |
| 7,592,757 B2 | 9/2009 | Hargenrader et al. |
| 7,594,738 B1 | 9/2009 | Lin et al. |
| D601,726 S | 10/2009 | Mollaert et al. |
| 7,598,681 B2 | 10/2009 | Lys et al. |
| 7,598,684 B2 | 10/2009 | Lys et al. |
| 7,600,907 B2 | 10/2009 | Liu et al. |
| 7,602,559 B2 | 10/2009 | Jang et al. |
| 7,616,849 B1 | 11/2009 | Simon |
| 7,618,157 B1 | 11/2009 | Galvez et al. |
| 7,619,366 B2 | 11/2009 | Diederiks |
| 7,635,201 B2 | 12/2009 | Deng |
| 7,635,214 B2 | 12/2009 | Perlo |
| 7,639,517 B2 | 12/2009 | Zhou et al. |
| 7,648,251 B2 | 1/2010 | Whitehouse et al. |
| 7,649,327 B2 | 1/2010 | Peng |
| D610,724 S | 2/2010 | Chiang et al. |
| 7,654,703 B2 | 2/2010 | Kan et al. |
| 7,661,839 B2 | 2/2010 | Tsai |
| D611,172 S | 3/2010 | Lin et al. |
| D612,528 S | 3/2010 | McGrath et al. |
| 7,690,813 B2 | 4/2010 | Kanamori et al. |
| 7,710,047 B2 | 5/2010 | Shteynberg et al. |
| 7,710,253 B1 | 5/2010 | Fredricks |
| 7,712,918 B2 | 5/2010 | Siemiet et al. |
| 7,748,886 B2 | 7/2010 | Pazula et al. |
| 7,758,207 B1 | 7/2010 | Zhou et al. |
| 7,759,881 B1 | 7/2010 | Melanson |
| D621,975 S | 8/2010 | Wang |
| 7,784,966 B2 | 8/2010 | Verfuerth et al. |
| 7,800,511 B1 | 9/2010 | Hutchison et al. |
| 7,815,338 B2 | 10/2010 | Siemiet et al. |
| 7,815,341 B2 | 10/2010 | Steedly et al. |
| 7,828,471 B2 | 11/2010 | Lin |
| 7,843,150 B2 | 11/2010 | Wang et al. |
| 7,848,702 B2 | 12/2010 | Ho et al. |
| 7,850,341 B2 | 12/2010 | Mrakovich et al. |
| 7,855,641 B1 | 12/2010 | Okafo |
| RE42,161 E | 2/2011 | Hochstein |
| 7,878,683 B2 | 2/2011 | Logan et al. |
| 7,887,216 B2 | 2/2011 | Patrick |
| 7,887,226 B2 | 2/2011 | Huang et al. |
| 7,889,051 B1 | 2/2011 | Billig et al. |
| D634,452 S | 3/2011 | de Visser |
| 7,904,209 B2 | 3/2011 | Podgorny et al. |
| D636,504 S | 4/2011 | Duster |
| 7,926,975 B2 | 4/2011 | Siemiet et al. |
| 7,938,562 B2 | 5/2011 | Ivey et al. |
| 7,946,729 B2 | 5/2011 | Ivey et al. |
| 7,952,292 B2 | 5/2011 | Vegter et al. |
| 7,976,185 B2 | 7/2011 | Uang et al. |
| 7,976,196 B2 | 7/2011 | Ivey et al. |
| 7,990,070 B2 | 8/2011 | Nerone |
| 7,997,770 B1 | 8/2011 | Meurer |
| 8,013,472 B2 | 9/2011 | Adest et al. |
| D650,097 S | 12/2011 | Trumble et al. |
| D650,494 S | 12/2011 | Tsao et al. |
| D652,968 S | 1/2012 | Aguiar et al. |
| 8,093,823 B1 | 1/2012 | Ivey et al. |
| D654,192 S | 2/2012 | Maxik et al. |
| 8,118,447 B2 | 2/2012 | Simon et al. |
| 8,136,738 B1 | 3/2012 | Kopp |
| 8,147,091 B2 | 4/2012 | Hsia et al. |
| 8,159,152 B1 | 4/2012 | Salessi |
| D660,472 S | 5/2012 | Aguiar et al. |
| 8,167,452 B2 | 5/2012 | Chou |
| 8,177,388 B2 | 5/2012 | Yen |
| 8,179,037 B2 | 5/2012 | Chan et al. |
| 8,183,989 B2 | 5/2012 | Tsai |
| D662,236 S | 6/2012 | Matsushita |
| 8,203,445 B2 | 6/2012 | Recker et al. |
| 8,214,084 B2 | 7/2012 | Ivey et al. |
| 8,230,690 B1 | 7/2012 | Salessi |
| 8,247,985 B2 | 8/2012 | Timmermans et al. |
| 8,251,544 B2 | 8/2012 | Ivey et al. |
| 8,262,249 B2 | 9/2012 | Hsia et al. |
| 8,272,764 B2 | 9/2012 | Son |
| 8,287,144 B2 | 10/2012 | Pedersen et al. |
| 8,297,788 B2 | 10/2012 | Bishop |
| 8,299,722 B2 | 10/2012 | Melanson |
| 8,304,993 B2 | 11/2012 | Tzou et al. |
| 8,313,213 B2 | 11/2012 | Lin et al. |
| 8,319,407 B2 | 11/2012 | Ke |
| 8,319,433 B2 | 11/2012 | Lin et al. |
| 8,319,437 B2 | 11/2012 | Carlin et al. |
| 8,322,878 B2 | 12/2012 | Hsia et al. |
| 8,324,817 B2 | 12/2012 | Ivey et al. |
| 8,337,071 B2 | 12/2012 | Negley et al. |
| 8,366,291 B2 | 2/2013 | Hoffmann |
| 8,376,579 B2 | 2/2013 | Chang |
| 8,376,588 B2 | 2/2013 | Yen |
| 8,382,322 B2 | 2/2013 | Bishop |
| 8,382,327 B2 | 2/2013 | Timmermans et al. |
| 8,382,502 B2 | 2/2013 | Cao et al. |
| 8,388,179 B2 | 3/2013 | Hood et al. |
| 8,398,275 B2 | 3/2013 | Wang et al. |
| 8,403,692 B2 | 3/2013 | Cao et al. |
| 8,405,314 B2 | 3/2013 | Jensen |
| 8,434,914 B2 | 5/2013 | Li et al. |
| 8,454,193 B2 | 6/2013 | Simon et al. |
| 8,496,351 B2 | 7/2013 | Lo et al. |
| 8,523,394 B2 | 9/2013 | Simon et al. |
| 8,531,109 B2 | 9/2013 | Visser et al. |
| 8,540,401 B2 | 9/2013 | Simon et al. |
| 8,571,716 B2 | 10/2013 | Ivey et al. |
| 8,628,216 B2 | 1/2014 | Ivey et al. |
| 8,653,984 B2 | 2/2014 | Ivey et al. |
| 8,674,626 B2 | 3/2014 | Siemiet et al. |
| 8,807,785 B2 | 8/2014 | Ivey et al. |
| 8,830,080 B2 | 9/2014 | Ivey et al. |
| 8,840,282 B2 | 9/2014 | Simon et al. |
| 8,870,412 B1 | 10/2014 | Timmermans et al. |
| 8,870,415 B2 | 10/2014 | Ivey |
| 9,016,895 B2 | 4/2015 | Handsaker |
| 9,072,171 B2 | 6/2015 | Simon |
| 9,101,026 B2 | 8/2015 | Ivey et al. |
| 9,163,794 B2 | 10/2015 | Simon et al. |

(56) References Cited

U.S. PATENT DOCUMENTS

| | | |
|---|---|---|
| 9,184,518 B2 | 11/2015 | Ivey et al. |
| 2001/0033488 A1 | 10/2001 | Chliwnyj et al. |
| 2001/0045803 A1 | 11/2001 | Cencur |
| 2002/0011801 A1 | 1/2002 | Chang |
| 2002/0015297 A1 | 2/2002 | Hayashi et al. |
| 2002/0038157 A1 | 3/2002 | Dowling et al. |
| 2002/0041159 A1 | 4/2002 | Kaping |
| 2002/0044066 A1 | 4/2002 | Dowling et al. |
| 2002/0047516 A1 | 4/2002 | Iwasa et al. |
| 2002/0047569 A1 | 4/2002 | Dowling et al. |
| 2002/0047624 A1 | 4/2002 | Stam et al. |
| 2002/0047628 A1 | 4/2002 | Morgan et al. |
| 2002/0048169 A1 | 4/2002 | Dowling et al. |
| 2002/0057061 A1 | 5/2002 | Mueller et al. |
| 2002/0060526 A1 | 5/2002 | Timmermans et al. |
| 2002/0070688 A1 | 6/2002 | Dowling et al. |
| 2002/0074559 A1 | 6/2002 | Dowling et al. |
| 2002/0074958 A1 | 6/2002 | Crenshaw |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0152298 A1 | 10/2002 | Kikta et al. |
| 2002/0153851 A1 | 10/2002 | Morgan et al. |
| 2002/0158583 A1 | 10/2002 | Lys et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0175639 A1 | 11/2002 | Pitigoi-Aron |
| 2002/0176253 A1 | 11/2002 | Lee |
| 2002/0176259 A1 | 11/2002 | Ducharme |
| 2002/0179816 A1 | 12/2002 | Haines et al. |
| 2002/0195975 A1 | 12/2002 | Schanberger et al. |
| 2003/0011538 A1 | 1/2003 | Lys et al. |
| 2003/0021117 A1 | 1/2003 | Chan |
| 2003/0028260 A1 | 2/2003 | Blackwell |
| 2003/0031015 A1 | 2/2003 | Ishibashi |
| 2003/0048641 A1 | 3/2003 | Alexanderson et al. |
| 2003/0052599 A1 | 3/2003 | Sun |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0085710 A1 | 5/2003 | Bourgault et al. |
| 2003/0095404 A1 | 5/2003 | Becks et al. |
| 2003/0100837 A1 | 5/2003 | Lys et al. |
| 2003/0102810 A1 | 6/2003 | Cross et al. |
| 2003/0133292 A1 | 7/2003 | Mueller et al. |
| 2003/0137258 A1 | 7/2003 | Piepgras et al. |
| 2003/0185005 A1 | 10/2003 | Sommers et al. |
| 2003/0185014 A1 | 10/2003 | Gloisten |
| 2003/0189412 A1 | 10/2003 | Cunningham |
| 2003/0218879 A1 | 11/2003 | Tieszen |
| 2003/0222578 A1 | 12/2003 | Cok |
| 2003/0222587 A1 | 12/2003 | Dowling, Jr. et al. |
| 2003/0234342 A1 | 12/2003 | Gaines et al. |
| 2004/0003545 A1 | 1/2004 | Gillespie |
| 2004/0007980 A1 | 1/2004 | Shibata |
| 2004/0012959 A1 | 1/2004 | Robertson et al. |
| 2004/0036006 A1 | 2/2004 | Dowling |
| 2004/0037088 A1 | 2/2004 | English et al. |
| 2004/0052076 A1 | 3/2004 | Mueller et al. |
| 2004/0062041 A1 | 4/2004 | Cross et al. |
| 2004/0075572 A1 | 4/2004 | Buschmann et al. |
| 2004/0080960 A1 | 4/2004 | Wu |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0113568 A1 | 6/2004 | Dowling et al. |
| 2004/0114371 A1 | 6/2004 | Lea et al. |
| 2004/0116039 A1 | 6/2004 | Mueller et al. |
| 2004/0124782 A1 | 7/2004 | Yu |
| 2004/0130908 A1 | 7/2004 | McClurg et al. |
| 2004/0130909 A1 | 7/2004 | Mueller et al. |
| 2004/0141321 A1 | 7/2004 | Dowling et al. |
| 2004/0145886 A1 | 7/2004 | Fatemi et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0189262 A1 | 9/2004 | McGrath |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0223328 A1 | 11/2004 | Lee et al. |
| 2004/0240890 A1 | 12/2004 | Lys et al. |
| 2004/0251854 A1 | 12/2004 | Matsuda et al. |
| 2004/0257007 A1 | 12/2004 | Lys et al. |
| 2005/0013133 A1 | 1/2005 | Yeh |
| 2005/0023536 A1 | 2/2005 | Shackle |
| 2005/0024877 A1 | 2/2005 | Frederick |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0043907 A1 | 2/2005 | Eckel et al. |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0078477 A1 | 4/2005 | Lo |
| 2005/0093488 A1 | 5/2005 | Hung et al. |
| 2005/0099824 A1 | 5/2005 | Dowling et al. |
| 2005/0107694 A1 | 5/2005 | Jansen et al. |
| 2005/0110384 A1 | 5/2005 | Peterson |
| 2005/0116667 A1 | 6/2005 | Mueller et al. |
| 2005/0128751 A1 | 6/2005 | Roberge et al. |
| 2005/0141225 A1 | 6/2005 | Striebel |
| 2005/0143173 A1 | 6/2005 | Barney et al. |
| 2005/0151489 A1 | 7/2005 | Lys et al. |
| 2005/0151663 A1 | 7/2005 | Tanguay |
| 2005/0154494 A1 | 7/2005 | Ahmed |
| 2005/0162093 A1 | 7/2005 | Timmermans et al. |
| 2005/0162100 A1 | 7/2005 | Romano et al. |
| 2005/0162101 A1 | 7/2005 | Leong et al. |
| 2005/0174473 A1 | 8/2005 | Morgan et al. |
| 2005/0174780 A1 | 8/2005 | Park |
| 2005/0184667 A1 | 8/2005 | Sturman et al. |
| 2005/0201112 A1 | 9/2005 | Machi et al. |
| 2005/0206529 A1 | 9/2005 | St.-Germain |
| 2005/0213320 A1 | 9/2005 | Kazuhiro et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219860 A1 | 10/2005 | Schexnaider |
| 2005/0219872 A1 | 10/2005 | Lys |
| 2005/0225979 A1 | 10/2005 | Robertson et al. |
| 2005/0231133 A1 | 10/2005 | Lys |
| 2005/0236029 A1 | 10/2005 | Dowling |
| 2005/0236998 A1 | 10/2005 | Mueller et al. |
| 2005/0242742 A1 | 11/2005 | Cheang et al. |
| 2005/0243577 A1 | 11/2005 | Moon |
| 2005/0248299 A1 | 11/2005 | Chemel et al. |
| 2005/0253533 A1 | 11/2005 | Lys et al. |
| 2005/0259424 A1 | 11/2005 | Zampini, II et al. |
| 2005/0264474 A1 | 12/2005 | Rast |
| 2005/0265019 A1 | 12/2005 | Sommers et al. |
| 2005/0275626 A1 | 12/2005 | Mueller et al. |
| 2005/0276051 A1 | 12/2005 | Caudle et al. |
| 2005/0276053 A1 | 12/2005 | Nortrup et al. |
| 2005/0276064 A1 | 12/2005 | Wu et al. |
| 2005/0281030 A1 | 12/2005 | Leong et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |

(56) References Cited

U.S. PATENT DOCUMENTS

| | | |
|---|---|---|
| 2006/0012997 A1 | 1/2006 | Catalano et al. |
| 2006/0016960 A1 | 1/2006 | Morgan et al. |
| 2006/0022214 A1 | 2/2006 | Morgan et al. |
| 2006/0028155 A1 | 2/2006 | Young |
| 2006/0028837 A1 | 2/2006 | Mrakovich |
| 2006/0034078 A1 | 2/2006 | Kovacik et al. |
| 2006/0044152 A1 | 3/2006 | Wang |
| 2006/0050509 A9 | 3/2006 | Dowling et al. |
| 2006/0050514 A1 | 3/2006 | Opolka |
| 2006/0056855 A1 | 3/2006 | Nakagawa et al. |
| 2006/0066447 A1 | 3/2006 | Davenport et al. |
| 2006/0076908 A1 | 4/2006 | Morgan et al. |
| 2006/0081863 A1 | 4/2006 | Kim et al. |
| 2006/0091826 A1 | 5/2006 | Chen |
| 2006/0092640 A1 | 5/2006 | Li |
| 2006/0098077 A1 | 5/2006 | Dowling |
| 2006/0104058 A1 | 5/2006 | Chemel et al. |
| 2006/0109648 A1 | 5/2006 | Trenchard et al. |
| 2006/0109649 A1 | 5/2006 | Ducharme et al. |
| 2006/0109661 A1 | 5/2006 | Coushaine et al. |
| 2006/0126325 A1 | 6/2006 | Lefebvre et al. |
| 2006/0126338 A1 | 6/2006 | Mighetto |
| 2006/0132061 A1 | 6/2006 | McCormick et al. |
| 2006/0132323 A1 | 6/2006 | Grady, Jr. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0170376 A1 | 8/2006 | Piepgras et al. |
| 2006/0186214 A1 | 8/2006 | Simon et al. |
| 2006/0192502 A1 | 8/2006 | Brown et al. |
| 2006/0193131 A1 | 8/2006 | McGrath et al. |
| 2006/0196953 A1 | 9/2006 | Simon et al. |
| 2006/0197661 A1 | 9/2006 | Tracy et al. |
| 2006/0198128 A1 | 9/2006 | Piepgras et al. |
| 2006/0208667 A1 | 9/2006 | Lys et al. |
| 2006/0215422 A1 | 9/2006 | Laizure, Jr. et al. |
| 2006/0220595 A1 | 10/2006 | Lu |
| 2006/0221606 A1 | 10/2006 | Dowling |
| 2006/0221619 A1 | 10/2006 | Nishigaki |
| 2006/0227558 A1 | 10/2006 | Osawa et al. |
| 2006/0232974 A1 | 10/2006 | Lee et al. |
| 2006/0238884 A1 | 10/2006 | Jang et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0265921 A1 | 11/2006 | Korall et al. |
| 2006/0273741 A1 | 12/2006 | Stalker, III |
| 2006/0274529 A1 | 12/2006 | Cao |
| 2006/0285325 A1 | 12/2006 | Ducharme et al. |
| 2007/0035255 A1 | 2/2007 | Shuster et al. |
| 2007/0035538 A1 | 2/2007 | Garcia et al. |
| 2007/0035965 A1 | 2/2007 | Holst |
| 2007/0040516 A1 | 2/2007 | Chen |
| 2007/0041220 A1 | 2/2007 | Lynch |
| 2007/0047227 A1 | 3/2007 | Ducharme |
| 2007/0053182 A1 | 3/2007 | Robertson |
| 2007/0053208 A1 | 3/2007 | Justel et al. |
| 2007/0057805 A1 | 3/2007 | Gomez |
| 2007/0064419 A1 | 3/2007 | Gandhi |
| 2007/0064425 A1 | 3/2007 | Frecska et al. |
| 2007/0070621 A1 | 3/2007 | Rivas et al. |
| 2007/0070631 A1 | 3/2007 | Huang et al. |
| 2007/0081423 A1 | 4/2007 | Chien |
| 2007/0086754 A1 | 4/2007 | Lys et al. |
| 2007/0086912 A1 | 4/2007 | Dowling et al. |
| 2007/0097678 A1 | 5/2007 | Yang |
| 2007/0109763 A1 | 5/2007 | Wolf et al. |
| 2007/0109782 A1 | 5/2007 | Wolf et al. |
| 2007/0115658 A1 | 5/2007 | Mueller et al. |
| 2007/0115665 A1 | 5/2007 | Mueller et al. |
| 2007/0120463 A1 | 5/2007 | Hayashi et al. |
| 2007/0120594 A1 | 5/2007 | Balakrishnan et al. |
| 2007/0127234 A1 | 6/2007 | Jervey, III |
| 2007/0133202 A1 | 6/2007 | Huang et al. |
| 2007/0139938 A1 | 6/2007 | Petroski et al. |
| 2007/0145915 A1 | 6/2007 | Roberge et al. |
| 2007/0146126 A1 | 6/2007 | Wang |
| 2007/0147046 A1 | 6/2007 | Arik et al. |
| 2007/0152797 A1 | 7/2007 | Chemel et al. |
| 2007/0152808 A1 | 7/2007 | LaCasse |
| 2007/0153514 A1 | 7/2007 | Dowling et al. |
| 2007/0159828 A1 | 7/2007 | Wang |
| 2007/0165402 A1 | 7/2007 | Weaver, Jr. et al. |
| 2007/0165405 A1 | 7/2007 | Chen |
| 2007/0173978 A1 | 7/2007 | Fein et al. |
| 2007/0177382 A1 | 8/2007 | Pritchard et al. |
| 2007/0182387 A1 | 8/2007 | Weirich |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0195527 A1 | 8/2007 | Russell |
| 2007/0195532 A1 | 8/2007 | Reisenauer et al. |
| 2007/0200725 A1 | 8/2007 | Fredericks et al. |
| 2007/0205712 A1 | 9/2007 | Radkov et al. |
| 2007/0206375 A1 | 9/2007 | Piepgras et al. |
| 2007/0211461 A1 | 9/2007 | Harwood |
| 2007/0211463 A1 | 9/2007 | Chevalier et al. |
| 2007/0228999 A1 | 10/2007 | Kit |
| 2007/0235751 A1 | 10/2007 | Radkov et al. |
| 2007/0236156 A1 | 10/2007 | Lys et al. |
| 2007/0236358 A1 | 10/2007 | Street et al. |
| 2007/0237284 A1 | 10/2007 | Lys et al. |
| 2007/0240346 A1 | 10/2007 | Li et al. |
| 2007/0241657 A1 | 10/2007 | Radkov et al. |
| 2007/0242466 A1 | 10/2007 | Wu et al. |
| 2007/0247450 A1 | 10/2007 | Lee |
| 2007/0247842 A1 | 10/2007 | Zampini et al. |
| 2007/0247847 A1 | 10/2007 | Villard |
| 2007/0247851 A1 | 10/2007 | Villard |
| 2007/0252161 A1 | 11/2007 | Meis et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0274070 A1 | 11/2007 | Wedell |
| 2007/0281520 A1 | 12/2007 | Insalaco et al. |
| 2007/0285926 A1 | 12/2007 | Maxik |
| 2007/0285933 A1 | 12/2007 | Southard et al. |
| 2007/0290625 A1 | 12/2007 | He et al. |
| 2007/0291483 A1 | 12/2007 | Lys |
| 2007/0296350 A1 | 12/2007 | Maxik et al. |
| 2008/0003664 A1 | 1/2008 | Tysoe et al. |
| 2008/0007945 A1 | 1/2008 | Kelly et al. |
| 2008/0012502 A1 | 1/2008 | Lys |
| 2008/0012506 A1 | 1/2008 | Mueller et al. |
| 2008/0013316 A1 | 1/2008 | Chiang |
| 2008/0013324 A1 | 1/2008 | Yu |
| 2008/0018261 A1 | 1/2008 | Kastner |
| 2008/0024067 A1 | 1/2008 | Ishibashi |
| 2008/0029720 A1 | 2/2008 | Li |
| 2008/0037226 A1 | 2/2008 | Shin et al. |
| 2008/0037245 A1 | 2/2008 | Chan |
| 2008/0037284 A1 | 2/2008 | Rudisill |
| 2008/0049434 A1 | 2/2008 | Marsh |
| 2008/0055894 A1 | 3/2008 | Deng |
| 2008/0062680 A1 | 3/2008 | Timmermans et al. |
| 2008/0068838 A1 | 3/2008 | Galke et al. |
| 2008/0068839 A1 | 3/2008 | Matheson |
| 2008/0074872 A1 | 3/2008 | Panotopoulos |
| 2008/0089075 A1 | 4/2008 | Hsu |
| 2008/0092800 A1 | 4/2008 | Smith et al. |
| 2008/0093615 A1 | 4/2008 | Lin et al. |
| 2008/0093998 A1 | 4/2008 | Dennery et al. |
| 2008/0094819 A1 | 4/2008 | Vaish |
| 2008/0094837 A1 | 4/2008 | Dobbins et al. |
| 2008/0129211 A1 | 6/2008 | Lin et al. |
| 2008/0130267 A1 | 6/2008 | Dowling et al. |
| 2008/0150444 A1 | 6/2008 | Usui et al. |
| 2008/0151535 A1 | 6/2008 | de Castris |
| 2008/0158871 A1 | 7/2008 | McAvoy et al. |
| 2008/0158887 A1 | 7/2008 | Zhu et al. |
| 2008/0164826 A1 | 7/2008 | Lys |
| 2008/0164827 A1 | 7/2008 | Lys |

(56) References Cited

U.S. PATENT DOCUMENTS

| | | |
|---|---|---|
| 2008/0164854 A1 | 7/2008 | Lys |
| 2008/0175003 A1 | 7/2008 | Tsou et al. |
| 2008/0180036 A1 | 7/2008 | Garrity et al. |
| 2008/0185961 A1 | 8/2008 | Hong |
| 2008/0186704 A1 | 8/2008 | Chou et al. |
| 2008/0192436 A1 | 8/2008 | Peng et al. |
| 2008/0198598 A1 | 8/2008 | Ward |
| 2008/0211386 A1 | 9/2008 | Choi et al. |
| 2008/0211419 A1 | 9/2008 | Garrity |
| 2008/0218993 A1 | 9/2008 | Li |
| 2008/0224629 A1 | 9/2008 | Melanson |
| 2008/0224636 A1 | 9/2008 | Melanson |
| 2008/0253125 A1 | 10/2008 | Kang et al. |
| 2008/0258631 A1 | 10/2008 | Wu et al. |
| 2008/0258647 A1 | 10/2008 | Scianna |
| 2008/0265799 A1 | 10/2008 | Sibert |
| 2008/0278092 A1 | 11/2008 | Lys et al. |
| 2008/0285257 A1 | 11/2008 | King |
| 2008/0285266 A1 | 11/2008 | Thomas |
| 2008/0290814 A1 | 11/2008 | Leong et al. |
| 2008/0291675 A1 | 11/2008 | Lin et al. |
| 2008/0298080 A1 | 12/2008 | Wu et al. |
| 2008/0304249 A1 | 12/2008 | Davey et al. |
| 2008/0310119 A1 | 12/2008 | Giacoma |
| 2008/0315773 A1 | 12/2008 | Pang |
| 2008/0315784 A1 | 12/2008 | Tseng |
| 2009/0002995 A1 | 1/2009 | Lee et al. |
| 2009/0016063 A1 | 1/2009 | Hu |
| 2009/0016068 A1 | 1/2009 | Chang |
| 2009/0018954 A1 | 1/2009 | Roberts |
| 2009/0021140 A1 | 1/2009 | Takasu et al. |
| 2009/0032604 A1 | 2/2009 | Miller |
| 2009/0033513 A1 | 2/2009 | Salsbury et al. |
| 2009/0046473 A1 | 2/2009 | Tsai et al. |
| 2009/0052186 A1 | 2/2009 | Xue |
| 2009/0059557 A1 | 3/2009 | Tanaka |
| 2009/0059559 A1 | 3/2009 | Pabst et al. |
| 2009/0059603 A1 | 3/2009 | Recker et al. |
| 2009/0065596 A1 | 3/2009 | Seem et al. |
| 2009/0067170 A1 | 3/2009 | Bloemen et al. |
| 2009/0067182 A1 | 3/2009 | Hsu et al. |
| 2009/0072945 A1 | 3/2009 | Pan et al. |
| 2009/0073693 A1 | 3/2009 | Nall et al. |
| 2009/0085500 A1 | 4/2009 | Zampini, II et al. |
| 2009/0086492 A1 | 4/2009 | Meyer |
| 2009/0091929 A1 | 4/2009 | Faubion |
| 2009/0091938 A1 | 4/2009 | Jacobson et al. |
| 2009/0101930 A1 | 4/2009 | Li |
| 2009/0115597 A1 | 5/2009 | Giacalone |
| 2009/0122571 A1 | 5/2009 | Simmons et al. |
| 2009/0139690 A1 | 6/2009 | Maerz et al. |
| 2009/0140285 A1 | 6/2009 | Lin et al. |
| 2009/0175041 A1 | 7/2009 | Yuen et al. |
| 2009/0185373 A1 | 7/2009 | Grajcar |
| 2009/0195186 A1 | 8/2009 | Guest et al. |
| 2009/0196034 A1 | 8/2009 | Gherardini et al. |
| 2009/0213588 A1 | 8/2009 | Manes |
| 2009/0219713 A1 | 9/2009 | Siemiet et al. |
| 2009/0231831 A1 | 9/2009 | Hsiao et al. |
| 2009/0268461 A1 | 10/2009 | Deak et al. |
| 2009/0273924 A1 | 11/2009 | Chiang |
| 2009/0273926 A1 | 11/2009 | Deng |
| 2009/0284169 A1 | 11/2009 | Valois |
| 2009/0290334 A1 | 11/2009 | Ivey et al. |
| 2009/0295776 A1 | 12/2009 | Yu et al. |
| 2009/0296017 A1 | 12/2009 | Itoh et al. |
| 2009/0296381 A1 | 12/2009 | Dubord |
| 2009/0302730 A1 | 12/2009 | Carroll et al. |
| 2009/0303720 A1 | 12/2009 | McGrath |
| 2009/0316408 A1 | 12/2009 | Villard |
| 2010/0002453 A1 | 1/2010 | Wu et al. |
| 2010/0008085 A1 | 1/2010 | Ivey et al. |
| 2010/0019689 A1 | 1/2010 | Shan |
| 2010/0027259 A1 | 2/2010 | Simon et al. |
| 2010/0033095 A1 | 2/2010 | Sadwick |
| 2010/0033964 A1 | 2/2010 | Choi et al. |
| 2010/0046222 A1 | 2/2010 | Yang |
| 2010/0061598 A1 | 3/2010 | Seo |
| 2010/0071946 A1 | 3/2010 | Hashimoto |
| 2010/0072904 A1 | 3/2010 | Eckel et al. |
| 2010/0073944 A1 | 3/2010 | Chen |
| 2010/0079085 A1 | 4/2010 | Wendt et al. |
| 2010/0096992 A1 | 4/2010 | Yamamoto et al. |
| 2010/0096998 A1 | 4/2010 | Beers |
| 2010/0102729 A1* | 4/2010 | Katzir ............... F21K 9/17 315/113 |
| 2010/0103664 A1 | 4/2010 | Simon et al. |
| 2010/0103673 A1 | 4/2010 | Ivey et al. |
| 2010/0106306 A1 | 4/2010 | Simon et al. |
| 2010/0109550 A1 | 5/2010 | Huda et al. |
| 2010/0109558 A1 | 5/2010 | Chew |
| 2010/0141173 A1 | 6/2010 | Negrete |
| 2010/0148650 A1 | 6/2010 | Wu et al. |
| 2010/0149806 A1 | 6/2010 | Yiu |
| 2010/0157608 A1 | 6/2010 | Chen et al. |
| 2010/0164404 A1 | 7/2010 | Shao et al. |
| 2010/0177532 A1 | 7/2010 | Simon et al. |
| 2010/0181178 A1 | 7/2010 | Chang et al. |
| 2010/0201269 A1 | 8/2010 | Tzou et al. |
| 2010/0207547 A1 | 8/2010 | Kuroki et al. |
| 2010/0220469 A1 | 9/2010 | Ivey et al. |
| 2010/0237790 A1 | 9/2010 | Peng |
| 2010/0265732 A1 | 10/2010 | Liu |
| 2010/0270925 A1 | 10/2010 | Withers |
| 2010/0277069 A1 | 11/2010 | Janik et al. |
| 2010/0289418 A1 | 11/2010 | Langovsky |
| 2010/0308733 A1 | 12/2010 | Shao |
| 2010/0309652 A1 | 12/2010 | Shen et al. |
| 2010/0320922 A1 | 12/2010 | Palazzol et al. |
| 2010/0327766 A1 | 12/2010 | Recker et al. |
| 2011/0006658 A1 | 1/2011 | Chan et al. |
| 2011/0006688 A1* | 1/2011 | Shim ............... F21K 9/17 315/119 |
| 2011/0090682 A1 | 4/2011 | Zheng et al. |
| 2011/0109454 A1 | 5/2011 | McSheffrey, Sr. et al. |
| 2011/0112661 A1 | 5/2011 | Jung et al. |
| 2011/0140136 A1 | 6/2011 | Daily et al. |
| 2011/0141745 A1 | 6/2011 | Gu et al. |
| 2011/0149564 A1 | 6/2011 | Hsia et al. |
| 2011/0156584 A1 | 6/2011 | Kim |
| 2011/0176298 A1 | 7/2011 | Meurer et al. |
| 2011/0199723 A1 | 8/2011 | Sato |
| 2011/0199769 A1 | 8/2011 | Bretschneider et al. |
| 2011/0204777 A1 | 8/2011 | Lenk |
| 2011/0260647 A1 | 10/2011 | Catalano et al. |
| 2011/0280010 A1 | 11/2011 | Ou et al. |
| 2011/0291588 A1 | 12/2011 | Tagare |
| 2012/0008314 A1 | 1/2012 | Simon et al. |
| 2012/0008315 A1 | 1/2012 | Simon et al. |
| 2012/0014086 A1 | 1/2012 | Jonsson |
| 2012/0043892 A1 | 2/2012 | Visser et al. |
| 2012/0063140 A1 | 3/2012 | Kong |
| 2012/0081894 A1 | 4/2012 | Simon et al. |
| 2012/0098439 A1 | 4/2012 | Recker et al. |
| 2012/0106144 A1 | 5/2012 | Chang |
| 2012/0106153 A1 | 5/2012 | Huang et al. |
| 2012/0113628 A1 | 5/2012 | Burrow et al. |
| 2012/0120660 A1 | 5/2012 | Grauvogel |
| 2012/0127726 A1 | 5/2012 | Yen |
| 2012/0139417 A1 | 6/2012 | Mironichev et al. |
| 2012/0146503 A1 | 6/2012 | Negley et al. |
| 2012/0146532 A1 | 6/2012 | Ivey et al. |
| 2012/0147597 A1 | 6/2012 | Farmer |
| 2012/0153865 A1 | 6/2012 | Rolfes et al. |
| 2012/0155073 A1 | 6/2012 | McCanless et al. |
| 2012/0161666 A1 | 6/2012 | Antony et al. |
| 2012/0194086 A1 | 8/2012 | Liu et al. |
| 2012/0195032 A1 | 8/2012 | Shew |
| 2012/0212951 A1 | 8/2012 | Lai et al. |
| 2012/0212953 A1 | 8/2012 | Bloom et al. |
| 2012/0230044 A1 | 9/2012 | Zhang et al. |
| 2012/0236533 A1 | 9/2012 | Nakamura et al. |
| 2012/0236554 A1 | 9/2012 | Rust |
| 2012/0243216 A1 | 9/2012 | Lai et al. |

(56) References Cited

U.S. PATENT DOCUMENTS

| | | |
|---|---|---|
| 2012/0243217 A1 | 9/2012 | Szprengiel et al. |
| 2012/0274214 A1 | 11/2012 | Radermacher et al. |
| 2012/0275154 A1 | 11/2012 | Hood et al. |
| 2012/0293991 A1 | 11/2012 | Lin |
| 2012/0293996 A1 | 11/2012 | Thomas et al. |
| 2012/0300409 A1 | 11/2012 | Lee |
| 2012/0300445 A1 | 11/2012 | Chu et al. |
| 2012/0300468 A1 | 11/2012 | Chang et al. |
| 2012/0300486 A1 | 11/2012 | Matsushita et al. |
| 2012/0307524 A1 | 12/2012 | Schapira et al. |
| 2012/0320598 A1 | 12/2012 | Son |
| 2013/0010473 A1 | 1/2013 | Dellian et al. |
| 2013/0038230 A1 | 2/2013 | Brown |
| 2013/0039051 A1 | 2/2013 | Wu |
| 2013/0044471 A1 | 2/2013 | Chen |
| 2013/0044476 A1 | 2/2013 | Bretschneider et al. |
| 2013/0050997 A1 | 2/2013 | Bretschneider et al. |
| 2013/0050998 A1 | 2/2013 | Chu et al. |
| 2013/0057146 A1 | 3/2013 | Chao |
| 2013/0058079 A1 | 3/2013 | Dellian et al. |
| 2013/0063944 A1 | 3/2013 | Lodhie et al. |
| 2013/0077297 A1 | 3/2013 | Wu et al. |
| 2013/0094200 A1 | 4/2013 | Dellian et al. |
| 2013/0147381 A1 | 6/2013 | Yang |
| 2013/0148349 A1 | 6/2013 | Pasqualini et al. |
| 2013/0206597 A1 | 8/2013 | Wang et al. |
| 2013/0230995 A1 | 9/2013 | Ivey et al. |
| 2013/0242553 A1 | 9/2013 | Feng et al. |
| 2013/0250610 A1 | 9/2013 | Brick et al. |
| 2014/0009068 A1 | 1/2014 | Ivey et al. |
| 2014/0009926 A1 | 1/2014 | Simon et al. |
| 2014/0015345 A1 | 1/2014 | Ivey et al. |
| 2014/0036492 A1 | 2/2014 | Simon et al. |
| 2014/0184082 A1 | 7/2014 | Siemiet et al. |
| 2014/0268727 A1 | 9/2014 | Amrine, Jr. et al. |
| 2014/0355262 A1 | 12/2014 | Ivey et al. |
| 2014/0368342 A1 | 12/2014 | Ivey et al. |
| 2015/0009690 A1 | 1/2015 | Simon et al. |
| 2015/0098228 A1 | 4/2015 | Simon et al. |
| 2015/0204487 A1 | 7/2015 | Scapa et al. |
| 2015/0334790 A1 | 11/2015 | Scapa et al. |

FOREIGN PATENT DOCUMENTS

| | | |
|---|---|---|
| CN | 2869556 Y | 2/2007 |
| CN | 101016976 A | 8/2007 |
| CN | 101075605 A | 11/2007 |
| CN | 201129681 Y | 10/2008 |
| CN | 201184574 Y | 1/2009 |
| CN | 101737664 A1 | 6/2010 |
| DE | 19651140 A1 | 6/1997 |
| DE | 19624087 A1 | 12/1997 |
| DE | 29819966 U1 | 3/1999 |
| DE | 29817609 U1 | 1/2000 |
| DE | 20018865 U1 | 2/2001 |
| DE | 102004035027 A1 | 2/2006 |
| DE | 102011004452 A1 | 8/2011 |
| EP | 0013782 B1 | 3/1983 |
| EP | 0091172 A2 | 10/1983 |
| EP | 0124924 B1 | 9/1987 |
| EP | 0174699 B1 | 11/1988 |
| EP | 0197602 B1 | 11/1990 |
| EP | 0714556 | 1/1991 |
| EP | 0214701 B1 | 3/1992 |
| EP | 0262713 B1 | 6/1992 |
| EP | 0203668 B1 | 2/1993 |
| EP | 0272749 B1 | 8/1993 |
| EP | 0337567 B1 | 11/1993 |
| EP | 0390262 B1 | 12/1993 |
| EP | 0359329 B1 | 3/1994 |
| EP | 0403011 B1 | 4/1994 |
| EP | 0632511 | 1/1995 |
| EP | 0432848 B1 | 4/1995 |
| EP | 0659531 A1 | 6/1995 |
| EP | 0403001 B1 | 8/1995 |
| EP | 0525876 | 5/1996 |
| EP | 0889283 A1 | 7/1999 |
| EP | 0458408 B1 | 9/1999 |
| EP | 0578302 B1 | 9/1999 |
| EP | 0723701 B1 | 1/2000 |
| EP | 1142452 B1 | 3/2001 |
| EP | 0787419 B1 | 5/2001 |
| EP | 1016062 B1 | 8/2002 |
| EP | 1195740 A3 | 1/2003 |
| EP | 1149510 B1 | 2/2003 |
| EP | 1056993 B1 | 3/2003 |
| EP | 0766436 B1 | 5/2003 |
| EP | 0924281 B1 | 5/2003 |
| EP | 0826167 B1 | 6/2003 |
| EP | 1147686 B1 | 1/2004 |
| EP | 1145602 B1 | 3/2004 |
| EP | 1422975 A1 | 5/2004 |
| EP | 0890059 B1 | 6/2004 |
| EP | 1348319 B1 | 6/2005 |
| EP | 1037862 B1 | 7/2005 |
| EP | 1346609 B1 | 8/2005 |
| EP | 1321012 B1 | 12/2005 |
| EP | 1610593 A2 | 12/2005 |
| EP | 1624728 A1 | 2/2006 |
| EP | 1415517 B1 | 5/2006 |
| EP | 1415518 B1 | 5/2006 |
| EP | 1438877 B1 | 5/2006 |
| EP | 1166604 B1 | 6/2006 |
| EP | 1479270 B1 | 7/2006 |
| EP | 1348318 B1 | 8/2006 |
| EP | 1399694 B1 | 8/2006 |
| EP | 1461980 B1 | 10/2006 |
| EP | 1110120 B1 | 4/2007 |
| EP | 1440604 B1 | 4/2007 |
| EP | 1047903 B1 | 6/2007 |
| EP | 1500307 | 6/2007 |
| EP | 0922305 B1 | 8/2007 |
| EP | 0922306 B1 | 8/2007 |
| EP | 1194918 B1 | 8/2007 |
| EP | 1833035 A1 | 9/2007 |
| EP | 1048085 B1 | 11/2007 |
| EP | 1852648 A1 | 11/2007 |
| EP | 1763650 B1 | 12/2007 |
| EP | 1776722 B1 | 1/2008 |
| EP | 1873012 A1 | 1/2008 |
| EP | 1881261 A1 | 1/2008 |
| EP | 1459599 B1 | 2/2008 |
| EP | 1887836 A2 | 2/2008 |
| EP | 1579733 B1 | 4/2008 |
| EP | 1145282 B1 | 7/2008 |
| EP | 1157428 B1 | 9/2008 |
| EP | 1000522 B1 | 12/2008 |
| EP | 1502483 B1 | 12/2008 |
| EP | 1576858 B1 | 12/2008 |
| EP | 1646092 B1 | 1/2009 |
| EP | 1579736 B1 | 2/2009 |
| EP | 1889519 B1 | 3/2009 |
| EP | 1537354 B1 | 4/2009 |
| EP | 1518445 B1 | 5/2009 |
| EP | 1337784 B1 | 6/2009 |
| EP | 2013530 B1 | 8/2009 |
| EP | 1461982 B1 | 9/2009 |
| EP | 2333407 A1 | 6/2011 |
| EP | 2430888 | 3/2012 |
| EP | 2469155 A1 | 6/2012 |
| EP | 2573457 A1 | 3/2013 |
| EP | 2554895 A1 | 6/2013 |
| FR | 2813115 | 2/2002 |
| GB | 2165977 A | 4/1986 |
| GB | 2215024 A | 9/1989 |
| GB | 2324901 A | 11/1998 |
| GB | 2447257 A | 9/2008 |
| GB | 2472345 A | 2/2011 |
| GB | 2486410 A | 6/2012 |
| GB | 2495647 A | 4/2013 |
| JP | S62241382 | 10/1987 |
| JP | S62241382 A | 10/1987 |
| JP | 06-054289 | 2/1994 |
| JP | H6-54103 U | 7/1994 |

(56) References Cited

FOREIGN PATENT DOCUMENTS

| | | |
|---|---|---|
| JP | 07-249467 | 9/1995 |
| JP | 7264036 | 10/1995 |
| JP | 08-162677 A | 6/1996 |
| JP | H10308536 | 11/1998 |
| JP | H10308536 A | 11/1998 |
| JP | 11-135274 A | 5/1999 |
| JP | H11-162234 A | 6/1999 |
| JP | H11-260125 A | 9/1999 |
| JP | 2001-238272 A | 8/2001 |
| JP | 2001-291406 A | 10/2001 |
| JP | 2002-141555 A | 5/2002 |
| JP | 2002289373 A | 10/2002 |
| JP | 3098271 U | 2/2004 |
| JP | 2004-119078 A | 4/2004 |
| JP | 2004-273234 A | 9/2004 |
| JP | 2004-335426 | 11/2004 |
| JP | 2005-158363 A | 6/2005 |
| JP | 2005-166617 A | 6/2005 |
| JP | 2005-347214 A | 12/2005 |
| JP | 2006012859 A | 1/2006 |
| JP | 2006-507641 A | 3/2006 |
| JP | 2005-322866 A | 12/2006 |
| JP | 2007-227342 A | 9/2007 |
| JP | 3139714 U | 2/2008 |
| JP | 2008-186758 A | 8/2008 |
| JP | 2008-258124 A | 10/2008 |
| JP | 2008-293753 A | 12/2008 |
| JP | 3154200 | 9/2009 |
| JP | 2009283183 A | 12/2009 |
| JP | 201015754 | 1/2010 |
| JP | 4491695 B1 | 6/2010 |
| JP | 2010-192229 A1 | 9/2010 |
| JP | 2010-205553 A | 9/2010 |
| KR | 10-2004-0008244 A | 1/2004 |
| KR | 10-2006-0112113 A | 10/2006 |
| KR | 20-0430022 Y1 | 11/2006 |
| KR | 10-2006-0133784 A | 12/2006 |
| KR | 10-2007-0063595 A | 6/2007 |
| KR | 10-0781652 | 12/2007 |
| KR | 10-0844538 B1 | 7/2008 |
| KR | 10-0888669 B1 | 3/2009 |
| KR | 10-0927851 B1 | 11/2009 |
| TW | M337036 | 7/2008 |
| TW | M349465 U | 1/2009 |
| WO | 99-06759 A1 | 2/1999 |
| WO | 99-10867 A1 | 3/1999 |
| WO | 99-31560 A2 | 6/1999 |
| WO | 99/45312 A1 | 9/1999 |
| WO | 99/57945 A1 | 11/1999 |
| WO | 00/01067 A2 | 1/2000 |
| WO | WO0225842 A2 | 3/2002 |
| WO | 02-61330 | 8/2002 |
| WO | WO02069306 A2 | 9/2002 |
| WO | WO02091805 A2 | 11/2002 |
| WO | WO02098182 A2 | 12/2002 |
| WO | WO02099780 A2 | 12/2002 |
| WO | WO03026358 A1 | 3/2003 |
| WO | WO03055273 A2 | 7/2003 |
| WO | WO03067934 A2 | 8/2003 |
| WO | WO03090890 A1 | 11/2003 |
| WO | WO03096761 A1 | 11/2003 |
| WO | WO2004021747 A2 | 3/2004 |
| WO | WO2004023850 A2 | 3/2004 |
| WO | WO2004032572 A2 | 4/2004 |
| WO | WO2004057924 | 7/2004 |
| WO | WO2004100624 A2 | 11/2004 |
| WO | WO2005031860 A2 | 4/2005 |
| WO | WO2005052751 A2 | 6/2005 |
| WO | WO2005060309 A2 | 6/2005 |
| WO | WO2005084339 A2 | 9/2005 |
| WO | WO2005089293 A2 | 9/2005 |
| WO | WO2005089309 A2 | 9/2005 |
| WO | WO2005103555 A1 | 11/2005 |
| WO | WO2005116519 A1 | 12/2005 |
| WO | WO2006023149 A2 | 3/2006 |
| WO | WO2006044328 A1 | 4/2006 |
| WO | WO2006046207 A1 | 5/2006 |
| WO | WO2006056120 A1 | 6/2006 |
| WO | 2006095315 A1 | 9/2006 |
| WO | 2006095316 A1 | 9/2006 |
| WO | WO2006093889 A2 | 9/2006 |
| WO | WO2006127666 A2 | 11/2006 |
| WO | WO2006127785 A2 | 11/2006 |
| WO | WO2006133272 A2 | 12/2006 |
| WO | WO2006137686 A1 | 12/2006 |
| WO | WO2007004679 A1 | 1/2007 |
| WO | WO2007081674 A1 | 7/2007 |
| WO | WO2007090292 A1 | 8/2007 |
| WO | WO2007094810 A2 | 8/2007 |
| WO | 2007143991 A1 | 12/2007 |
| WO | WO2008018002 A2 | 2/2008 |
| WO | WO2008027093 A2 | 3/2008 |
| WO | WO2008061991 A1 | 5/2008 |
| WO | WO2008110978 A1 | 9/2008 |
| WO | 2008129488 A2 | 10/2008 |
| WO | WO2008137460 A1 | 11/2008 |
| WO | WO2009061124 A2 | 5/2009 |
| WO | WO2009067074 A1 | 5/2009 |
| WO | WO2009111978 A1 | 9/2009 |
| WO | WO2009143047 A2 | 11/2009 |
| WO | 2010011971 A1 | 1/2010 |
| WO | WO2010014437 A2 | 2/2010 |
| WO | WO2010030509 A2 | 3/2010 |
| WO | WO2010047896 A3 | 4/2010 |
| WO | WO2010047898 A3 | 4/2010 |
| WO | WO2010047973 A3 | 4/2010 |
| WO | WO2010069983 A1 | 6/2010 |
| WO | WO2010083370 A2 | 7/2010 |
| WO | WO2010088105 A3 | 8/2010 |
| WO | WO2010132625 A2 | 11/2010 |
| WO | WO2010141537 A2 | 12/2010 |
| WO | WO2011005562 A2 | 1/2011 |
| WO | WO2011005579 A2 | 1/2011 |
| WO | 2011021719 A2 | 2/2011 |
| WO | 2011074884 A2 | 6/2011 |
| WO | WO2011072308 A1 | 6/2011 |
| WO | WO2011113709 A2 | 9/2011 |
| WO | WO2011117059 A1 | 9/2011 |
| WO | 2011159436 A2 | 12/2011 |
| WO | WO2012001584 A1 | 1/2012 |
| WO | WO2012004708 A2 | 1/2012 |
| WO | WO2012007899 A1 | 1/2012 |
| WO | 2012019535 A2 | 2/2012 |
| WO | WO2012025626 A1 | 3/2012 |
| WO | WO2012063174 A1 | 5/2012 |
| WO | 2012/085738 | 6/2012 |
| WO | WO2012117018 A1 | 9/2012 |
| WO | WO2012129301 A1 | 9/2012 |
| WO | WO2012131522 A1 | 10/2012 |
| WO | WO2012131547 A1 | 10/2012 |
| WO | WO2013028965 A2 | 2/2013 |
| WO | WO2013029960 A1 | 3/2013 |
| WO | WO2013030128 A2 | 3/2013 |
| WO | WO2013045255 A1 | 4/2013 |
| WO | WO2013045439 A1 | 4/2013 |
| WO | WO2013057660 A2 | 4/2013 |
| WO | WO2013079242 A1 | 6/2013 |
| WO | WO2013088299 A1 | 6/2013 |
| WO | 2013/097823 A1 | 7/2013 |
| WO | 2013/098700 A1 | 7/2013 |
| WO | 2013113548 A1 | 8/2013 |
| WO | 2013113661 A1 | 8/2013 |
| WO | 2013121347 A1 | 8/2013 |
| WO | 2013132383 A1 | 9/2013 |
| WO | 2013135527 A1 | 9/2013 |
| WO | WO2013132383 A1 | 9/2013 |
| WO | WO2013135527 A1 | 9/2013 |
| WO | 2013167419 A1 | 11/2013 |

OTHER PUBLICATIONS

PLC-96973-PC PLC Lighting Elegance Modern/Contemporary Pendant Light, [online], [retrieved on Feb. 27, 2009] Retrieved from

(56) References Cited

OTHER PUBLICATIONS the Arcadian Lighting Web Page using Internet <URL: http/www.arcadianlighting.com/plc-96978-pc.html>.
Saha et al, "Location Determination of a Mobile Device using IEEE 802.11 Access Point Signals", May 5, 2002 in 20 pages.
Sensor Switch, nLight Lighting Control System, [online], [retrieved on Jan. 11, 2008] Retrieved from Sensor Switch web page using Internet <URL: http://www.sensorswitch.com>.
Six Strategies, [online], [retrieved on Jan. 11, 2008] Retrieved from Encelium Technologies Inc. Web Page using Internet <URL: http://www.encelium.com/products/strategies.html>.
Spencer, Eugene. High Sales, Low Utilization. Green Intelligent Buildings, Feb. 1, 2007. [online]. Retrieved from Green Intelligent Buildings web page using Internet <URL: http://www.greenintelligentbuildings.com/CDA/IBT_Archive/BNP_GUID_9-5-2006_A_10000000000000056772>.
Telecite Products & Services—Display Options, [online], [retrieved on Jan. 13, 2000] Retrieved from Telecite Web page using Internet <URL: http://www.telecite.com/en/products/options en.htm>.
Traffic Signal Products—Transportation Products Group, [online], [retrieved on Jan. 13, 2000] Retrieved from the Dialight Web Page using Internet <URL: http://www.dialight.com/trans.htm>.
Truck-Lite, LEDSelect—LED, Model 35, Clearance & Marker Lighting, [online], [retrieved on Jan. 13, 2000] Retrieved from Truck-Lite Web Page using Internet <URL: http://trucklite.com/leds14.html>.
Truck-Lite, LEDSelect—LED, Model 45, Stop, Turn & Tail Lighting [online], [retrieved on Jan. 13, 2000] Retrieved from Truck-Lite Web Page using Internet <URL: http://trucklite.com/leds4.html>.
Truck-Lite, LEDSelect—LED, Super 44, Stop, Turn & Tail Lighting, [online], [retrieved on Jan. 13, 2000] Retrieved from Truck-Lite Web Page using Internet <URL: http://trucklite.com/leds2.html>.
Wolsey, Robert. Interoperable Systems: The Future of Lighting Control, Lighting Research Center, Jan. 1, 1997, vol. 2 No. 2, Rensselaer Polytechnic Institute, Troy, New York [online]. Retrieved Lighting Research Center Web Page using Internet <URL: http://www.lrc.rpi.edu/programs/Futures/LF-BAS/index.asp>.
International Search Report and Written Opinion dated Feb. 15, 2013 from the corresponding International Application No. PCT/US2012/052244 filed on Aug. 24, 2012.
International Search Report and Written Opinion dated Aug. 30, 2011 for the corresponding International Application No. PCT/US2011/029994 filed Mar. 25, 2011.
Notification of Transmittal, the International Search Report and the Written Opinion of the International Searching Authority dated May 7, 2012, from the corresponding International Application No. PCT/US2011/064151.
Supplementary European Search Report for corresponding European Application No. 09822381.1 mailed Jan. 4, 2013 in 5 pages.
Supplementary European Search Report dated Feb. 22, 2012 from European Patent Application No. 09822424.9.
International Report on Patentability dated May 24, 2010 from the corresponding International Application No. PCT/US2009/060087 filed Oct. 9, 2009.
Extended European Search Report for co-pending European Application No. 10 73 2124 mailed on Dec. 13, 2012 in 8 pages.
Extended European Search Report for co-pending European Application No. 09822425.6 mailed on Aug. 30, 2012 in 9 pages.
Extended European Search Report for co-pending European Application No. 10797596.3 mailed on Jan. 17, 2013 in 11pages.
Extended European Search Report for co-pending European Application No. 10736237.8 mailed on Oct. 19, 2012 in 5 pages.
Extended European Search Report for co-pending European Application No. 10738925.6 mailed on Oct. 1, 2012 in 7 pages.
Examination and Search Report mailed on Jul. 2, 2012 in cooresponding United Kingdom Application No. 1018896.9 in 4 pages.
International Search Report and Written Opinion dated Jan. 4, 2010 from the corresponding International Application No. PCT/US2009/044313 filed May 18, 2009.
International Search Report and Written Opinion dated Feb. 7, 2011 from the corresponding International Application No. PCT/US2010/039678 filed Jun. 23, 2010.
International Search Report and Written Opinion dated May 7, 2010 from the corresponding International Application No. PCT/US2009/057109 filed on Sep. 16, 2009.
International Search Report and Written Opinion dated Apr. 8, 2010 from the corresponding International Application No. PCT/2009/055114 filed on Aug. 27, 2009.
International Search Report and Written Opinion dated Feb. 8, 2011 from the corresponding International Application No. PCT/US2010/039608 filed Jun. 23, 2010.
International Search Report and Written Opinion dated Dec. 13, 2010 from the corresponding International Application No. PCT/US2010/037006 filed Jun. 2, 2010.
International Search Report and Written Opinion dated Mar. 13, 2012 from the corresponding International Application No. PCT/US2011/052995 filed on Sep. 23, 2011.
International Search Report and Written Opinion dated May 14, 2010 from the corresponding International Application No. PCT/US2009/060085 filed Oct. 9, 2009.
International Search Report and Written Opinion dated Aug. 16, 2010 from the corresponding International Application No. PCT/US2010/021131 filed on Jan. 15, 2010.
International Search Report and Written Opinion dated Jul. 16, 2009 from the corresponding International Application No. PCT/US2008/084650 filed Nov. 25, 2008.
International Search Report and Written Opinion dated Aug. 17, 2010 from the corresponding International Application No. PCT/US2010/021489 filed on Jan. 20, 2010.
International Search Report and Written Opinion dated Jul. 17, 2009 from the corresponding International Application No. PCT/US2008/085118 filed Dec. 1, 2008.
International Search Report and Written Opinion dated Nov. 21, 2011 from the corresponding International Application No. PCT/US2011/029932 filed on Mar. 25, 2011.
International Search Report and Written Opinion dated Mar. 22, 2010 from the corresponding International Application No. PCT/US2009/053853 filed Aug. 14, 2009.
International Search Report and Written Opinion dated Nov. 23, 2011 from the corresponding International Application No. PCT/US2011/042761 filed on Jul. 1, 2011.
International Search Report and Written Opinion dated Nov. 23, 2011 from the corresponding International Application No. PCT/US2011/042775 filed on Jul. 1, 2011.
International Search Report and Written Opinion dated Dec. 24, 2010 from the corresponding International Application No. PCT/US2010/034635 filed May 13, 2010.
International Search Report and Written Opinion dated May 24, 2010 from the corresponding International Application No. PCT/2009/060083 filed Oct. 9, 2009.
Notification of Transmittal, the International Search Report and the Written Opinion of the International Searching Authority dated May 7, 2012 from the corresponding International Application No. PCT/US2011/058312.
International Search Report and Written Opinion dated Aug. 25, 2009 from corresponding International Application No. PCT/US2009/031049 filed Jan. 15, 2009.
International Search Report and Written Opinion dated Jan. 25, 2010 from the corresponding International Application No. PCT/US2009/048623 filed Jun. 25, 2009.
International Search Report and Written Opinion dated Feb. 26, 2010 from the corresponding International Application No. PCT/US2009/050949 filed Jul. 17, 2009.
International Search Report and Written Opinion dated Apr. 30, 2010 from the corresponding International Application No. PCT/US2009/057072 filed on Sep. 16, 2009.
International Search Report and Written Opinion dated Jul. 30, 2010 from the corresponding International Application No. PCT/US2010/021448 filed on Jan. 20, 2010.

(56) References Cited

OTHER PUBLICATIONS

International Search Report and Written Opinion dated Sep. 30, 2011 from the corresponding International Application No. PCT/US2011/029905 filed on Mar. 25, 2011.
Best Practice Guide—Commercial Office Buildings—Central HVAC System. [online], [Retrieved on Jan. 17, 2008] Retrieved from Flex Your Power Organization web page using Internet <URL: http://www.fypower.org/bpg/module.html?b=offices&m+Central HVAC Systems&s=Contr . . . >.
International Search Report and Written Opinion dated Feb. 9, 2012 from the corresponding International Application No. PCT/US2011/043524 filed on Jul. 11, 2011.
Airport International. Fly High With Intelligent Airport Building and Security Solutions [online], [retrieved on Oct. 24, 2008]. Retrieved from Airport International web page using Internet <URL: http://www.airport-int.com/categories/airport-building-and-security-solutions/fly-high-with-intelligent-airport-building-and-security-solutions.html>.
Cornell University. Light Canopy—Cornell University Solar Decathlon, [online], [retrieved on Jan. 17, 2008] Retrieved from Cornell University web page using Internet <URL: http://cusd.cornell.edu/cusd/web/index.php/page/show/section/Design/page/controls>.
D.N.A.-III, [online], [retrieved Mar. 10, 2009] Retrieved from the PLC Lighting Web Page using Internet <URL: http://www.plclighting.com/product_info.php?cPath=1&products_id=92>.
E20112-22 Starburst Collection, [online], [retrieved on Jul. 10, 2010] Retrieved from ET2 Contemporary Lighting using Internet <URL: http://www.et2online.com/proddetail.aspx?ItemID=E20112-22>.
E20116-18 Larmes Collection, [online], [retrieved on Jul. 10, 2010] Retrieved from ET2 Contemporary Lighting using Internet <URL: http://www.et2online.com/proddetail.aspx?ItemID=E20116-18>.
E20524-10 & E20525-10 Curva Collection, [online], [retrieved on Jul. 10, 2010] Retrieved from ET2 Contemporary Lighting using Internet <URL: http://www.et2online.com/proddetail.aspx?ItemID=E20524-10 & E20525-10>.
E20743-09 Stealth Collection, [online], [retrieved on Jul. 10, 2010] Retrieved from ET2 Contemporary Lighting using Internet <URL: http://www.et2online.com/proddetail.aspx?ItemID=E20743-09>.
E22201-44 Esprit Collection, [online], [retrieved on Jul. 10, 2010] Retrieved from ET2 Contemporary Lighting using Internet <URL: http://www.et2online.com/proddetail.aspx?ItemID=E22201-44>.
Experiment Electronic Ballast. Electronic Ballast for Fluorescent Lamps [online], Revised Fall of 2007. [Retrieved on Sep. 1, 1997]. Retrieved from Virginia Tech Web Page using Internet <URL: http://www.ece.vt.edu/ece3354/labs/ballast.pdf.>.
Henson, Keith. The Benefits of Building Systems Integration, Access Control & Security Systems Integration, Oct. 1, 2000, Penton Media. [online], [retrieved on Oct. 24, 2008] Retrieved from Security Solutions Web page using Internet <URL: http://securitysolutions.com/mag/security_benefits_building_systems/>.
Hightower et al, "A Survey and Taxonomy of Location Systems for Ubiquitous Computing", University of Washington, Computer Science and Engineering, Technical Report UW-CSE Jan. 8, 2003, IEEE, Aug. 24, 2001 in 29 pages.
Lawrence Berkeley National Labratory. Lighting Control System—Phase Cut Carrier. University of California, [online] [retrieved on Jan. 14, 2008] Retrieved from Lawrence Berkeley National Labratory web page using Internet <URL: http://www.lbl.gov/tt/techs/lbnl1871.html>.
LCD Optics 101 Tutorial [online]. 3M Corporation, [retrieved on Jan. 6, 2010]. Retrieved from the internet: <URL: http://solutions.3m.com/wps/portal/3M/en_US/Vikuiti1/BrandProducts/secondary/optics101/>.
LED Lights, Replacement LED lamps for any incandescent light, [online], [retrieved on Jan. 13, 2000] Retrieved from LED Lights Web Page using Internet <URL: http://www.ledlights.com/replac.htm>.
LEDtronics, LEDtronics Catalog, 1996, Page 10, LEDtronics, Torrance, California.
Phason Electronic Control Systems, Light Level Controller (LLC) case study. Nov. 30, 2004. 3 pages, Phason Inc., Winnipeg, Manitoba, Canada.
Philips. Sense and Simplicity—Licensing program for LED Luminaires and Retrofits, Philips Intellectual Property & Standards, May 5, 2009.
Piper. The Best Path to Efficiency. Building Operating Management, Trade Press Publishing Company May 2000 [online], [retrieved on Jan. 17, 2008]. Retrieved from Find Articles Web Page using Internet <URL:http://findarticles.com/p/articles/mi_qu3922/is_200005/ai_n8899499/>.
European Office Action in EP098224249, a related matter, mailed Jan. 13, 2015, 2 pages.
Extended European Search Report for European Application No. 09822382.9 mailed on Sep. 19, 2014 in 8 pages.
ISR & WO for PCT/US2015011711 dated Mar. 23, 2015.
Office Action in related Japanese matter, dated Feb. 24, 2015.
International Search Report in PCT/US2015011711 dated Mar. 23, 2015.
Office Action in Japanese Patent Application No. 2013518754 citing new art, dated Feb. 24, 2015.
International Search Report and Written Opinion dated Sep. 23, 2013 for the International Application No. PCT/US2013/049432 filed Jul. 5, 2013.
Supplementary European Search Report for corresponding European Application No. 10797603.7 mailed Aug. 5, 2013 in 5 pages.
International Search Report and Written Opinion dated Nov. 16, 2015 from the International Application No. PCT/US20150030619 citing new art.
International Search Report for International Application No. PCT/US2015/011711 dated Mar. 23, 2015.

* cited by examiner

LED-BASED LIGHT WITH ADDRESSED LEDS

CROSS REFERENCE TO RELATED APPLICATION

This application claims priority to U.S. Provisional Patent Application No. 61/930,170, filed Jan. 22, 2014, which is incorporated herein by reference in its entirety.

TECHNICAL FIELD

The embodiments disclosed herein relate to a light emitting diode (LED)-based light for replacing a fluorescent light in a standard fluorescent light fixture.

BACKGROUND

Fluorescent lights are widely used in a variety of locations, such as schools and office buildings. Although conventional fluorescent lights have certain advantages over, for example, incandescent lights, they also pose certain disadvantages including, inter alia, disposal problems due to the presence of toxic materials within the light.

LED-based lights designed as one-for-one replacements for fluorescent lights have appeared in recent years. These LED-based lights are often designed to achieve a general lighting outcome compatible with a variety of lighting fixtures and lighting applications. However, it may be desirable to design an LED-based light capable of generate multiple different lighting outcomes.

SUMMARY

Disclosed herein are embodiments of LED-based light and systems for controlling LED-based lights.

In one aspect, an LED-based replacement light includes multiple LEDs, a controller in communication with the LEDs, a housing for the LEDs and a connector. The LEDs have different logical control addresses associated among them, with each logical control address subjecting one or more of the LEDs associated therewith to individual control. The controller is configured to generate signals that individually control the operating states of the one or more LEDs associated with each logical control address. The connector is disposed at an end of the housing and is shaped for connection with a light socket.

In another aspect, an LED-based replacement light includes one or more first LEDs, one or more second LEDs, a housing for the first LEDs and the second LEDs and a connector. The first LEDs are associated with a first logical control address subjecting them to individual control, and have a first spatial distribution profile when controlled to an ON state. The second LEDs are associated with a second logical control address subjecting them to individual control, and are in optical communication with at least one optical device shaped to modify the light emanating therefrom when controlled to an ON state and achieve a second spatial distribution profile different from the first spatial distribution profile. The connector is disposed at an end of the housing, the connector shaped for connection with a light socket.

In yet another aspect, an LED-based replacement light includes an elongate circuit board, multiple LEDs mounted along the length of the circuit board, a controller in communication with the LEDs, an elongate housing for the circuit board and the LEDs and a pair of end caps disposed at opposing ends of the housing. The LEDs have different logical control addresses associated among them, with each logical control address subjecting one or more LEDs associated therewith to individual control. The controller is configured to generate signals that individually control of the operating states of the one or more LEDs associated with each logical control address. Each end cap includes a connector shaped for connection with a fluorescent light socket.

These and other aspects will be described in additional detail below.

BRIEF DESCRIPTION OF THE DRAWINGS

The various features, advantages and other uses of the present apparatus and systems will become more apparent by referring to the following detailed description and drawings in which.

DETAILED DESCRIPTION

This disclosure relates to LED-based lights with addressed LEDs. In the disclosed LED-based lights, the LEDs are assigned with different logical control addresses. In the example implementations, the operating state of the LEDs assigned with one logical control address can be controlled individually from the operating state of LEDs assigned with another logical control address. By controlling the operating states of the LEDs in different combinations, multiple lighting outcomes can be generated with the LED-based light to suite different lighting applications. Control over the LED-based light can be coordinated with the control of like LED-based lights to generate even more variety in possible lighting outcomes.

Figure 1:
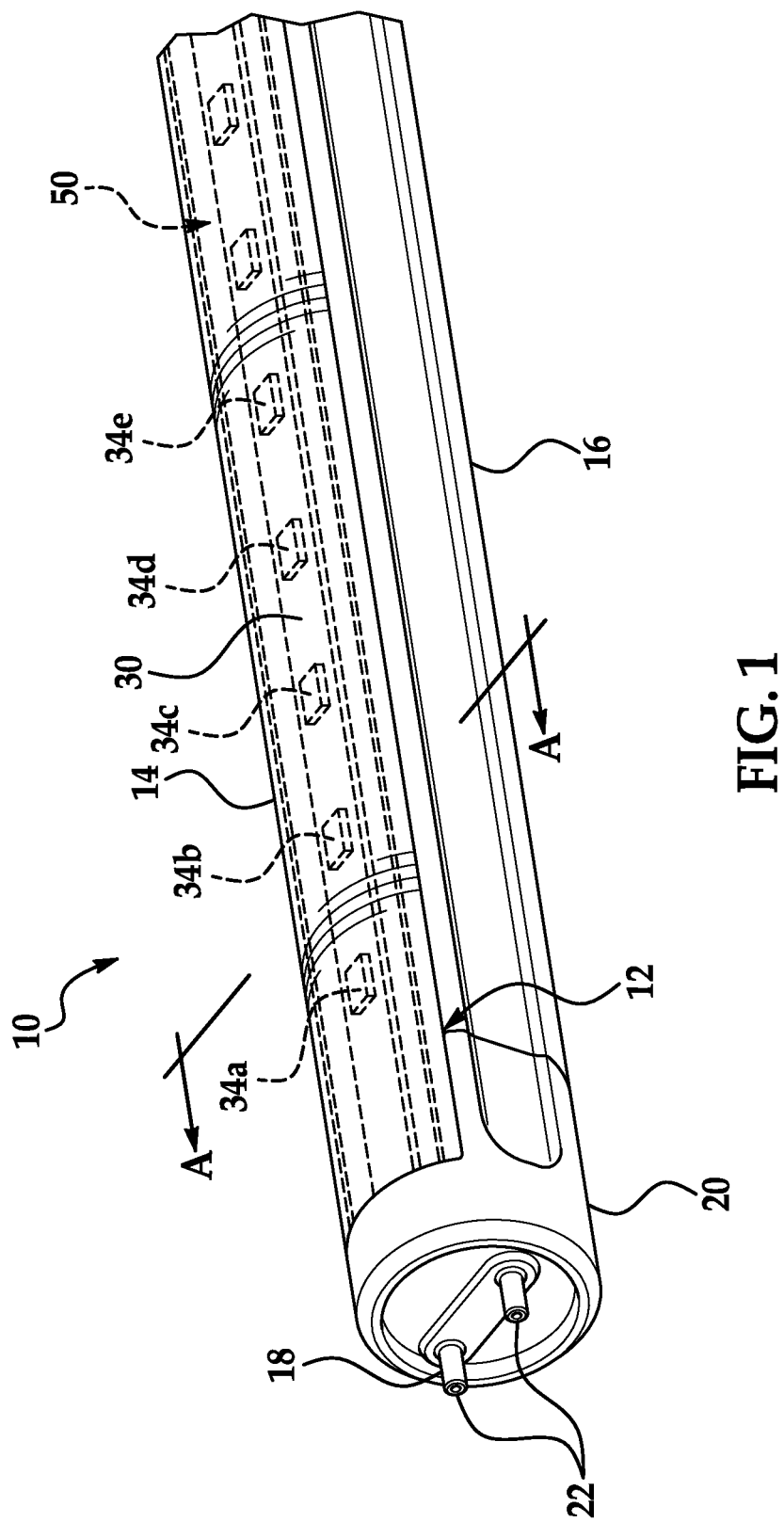
FIG. 1 is a partial perspective view of an example of an LED-based light with individually addressed LEDs.
Figure 2:
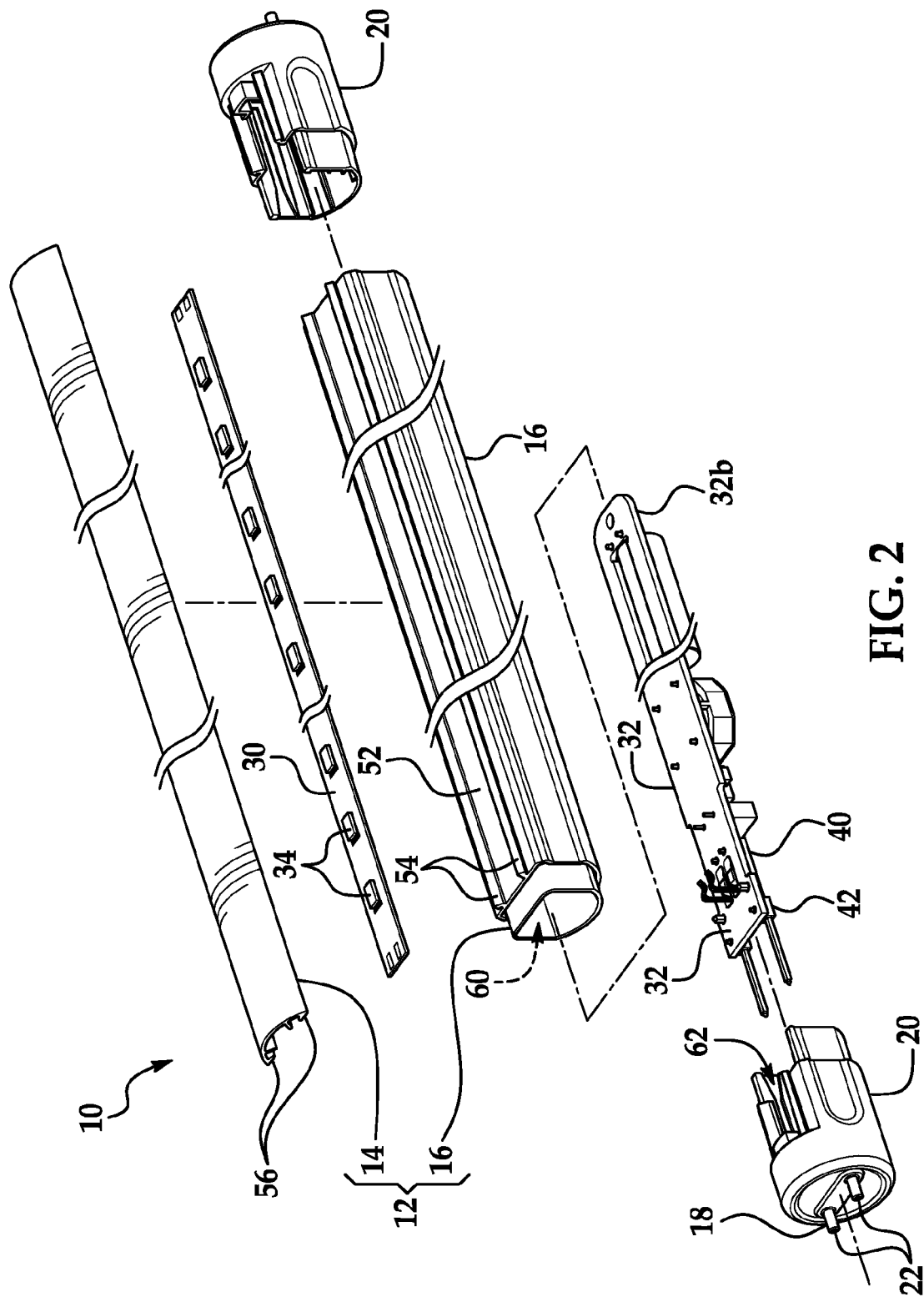
FIG. 2 is a perspective view of the LED-based light of FIG. 1.

An example of an LED-based light 10 for replacing a conventional light in a standard light fixture is illustrated in FIGS. 1 and 2. As shown in FIGS. 1 and 2 and explained in greater detail below, the LED-based light includes a plurality of light producing LEDs 34. In the following description, the identifier "34" is used to reference one or more of the LEDs 34 generally, while a specific identifier (e.g., "34A") is used to reference a specific individual LED 34 or a specific group of LEDs 34 as needed to facilitate discussion. The LED-based light 10 includes a housing 12 and has a pair of end caps 20 positioned at the ends of the housing 12. An LED circuit board 30 including the LEDs 34 and a power supply circuit board 32 are arranged within the housing 12.

The housing 12 of the LED-based light 10 can generally define a single package sized for use in a standard fluorescent light fixture. In the illustrated example, the pair of end caps 20 is attached at opposing longitudinal ends of the housing 12 for physically connecting the LED-based light 10 to a light fixture. As shown, each end cap 20 carries an electrical connector 18 configured to physically connect to the light fixture. The electrical connectors 18 can be the sole physical connection between the LED-based light 10 and the light fixture. One example of a light fixture for the LED-based light 10 is a troffer designed to accept conventional fluorescent lights, such as T5, T8 or T12 fluorescent tube lights. These and other light fixtures for the LED-based light 10 can include one or more sockets adapted for physical engagement with the electrical connectors 18. Each of the illustrated electrical connectors 18 is a bi-pin connector including two pins 22. Bi-pin electrical connectors 18 are compatible with many fluorescent light fixtures and sockets, although other types of electrical connectors can be used, such as a single pin connector or a screw type connector.

The light fixture can connect to a power source, and at least one of the electrical connectors 18 can additionally electrically connect the LED-based light 10 to the light fixture to provide power to the LED-based light 10. In this example, each electrical connector 18 can include two pins 22, although two of the total four pins can be "dummy pins" that provide physical but not electrical connection to the light fixture. The light fixture can optionally include a ballast for electrically connecting between the power source and the LED-based light 10.

While the illustrated housing 12 is cylindrical, a housing having a square, triangular, polygonal, or other cross sectional shape can alternatively be used. Similarly, while the illustrated housing 12 is linear, housings having an alternative shape, e.g., a U-shape or a circular shape can alternatively be used. The LED-based light 10 can have any suitable length. For example, the LED-based light 10 may be approximately 48" long, and the housing 12 can have a 0.625", 1.0" or 1.5" diameter for engagement with a standard fluorescent light fixture.

The housing 12 can be formed by attaching multiple individual parts, not all of which need be light transmitting. For example, illustrated example of the housing 12 is formed in part by attaching a lens 14 at least partially defining the housing 12 to an opaque lower portion 16. The illustrated housing 12 has a generally bipartite configuration defining a first cavity 50 between the lower portion 16 and the lens 14 sized and shaped for housing the LED circuit board 30 and a second cavity 60 defined by the lower portion 16 sized and shaped for housing the power supply circuit board 32.

As shown, the lower portion 16 defines an LED mounting surface 52 for supporting the LED circuit board 30. The LED mounting surface 52 can be substantially flat, so as to support a flat underside of the LED circuit board 30 opposite the LEDs 34. After attachment of the lens 14 to the lower portion 16 during assembly of the LED-based light 10, the LED circuit board 30 is positioned within the first cavity 50 and adjacent the lens 14, such that the LEDs 34 of the LED circuit board 30 are oriented to illuminate the lens 14.

The illustrated lower portion 16 has a tubular construction to define the second cavity 60, although the lower portion 16 could be otherwise configured to define a cavity configured for housing the power supply circuit board 32. The LED-based light 10 can include features for supporting the power supply circuit board 32 within the second cavity 60. For example, as shown, an end cap 20 may include channels 62 configured to slidably receive outboard portions of an end 32a of the power supply circuit board 32. It will be understood that the channels 62 are provided as a non-limiting example and that the power supply circuit board 32 may be otherwise and/or additionally supported within the second cavity 60.

The lower portion 16 may be constructed from a thermally conductive material and configured as a heat sink to enhance dissipation of heat generated by the LEDs 34 during operation to an ambient environment surrounding the LED-based light 10. In the exemplary LED-based light 10, an LED mounting surface 52 of the lower portion 16 is thermally coupled to the LEDs 34 through the LED circuit board 30, and the remainder of the lower portion 16 defines a heat transfer path from the LED mounting surface 52 to the ambient environment.

The lower portion 16 and the lens 14 may each include complementary structures permitting for attachment of the lens 14 to the lower portion 16 to define the first cavity 50. For example, as shown, the lower portion 16 may include a pair of hooked projections 54 for retaining a corresponding pair of projections 56 of the lens 14. The projections 56 of the lens 14 can be slidably engaged with the hooked projections 54 of the lower portion 16, or can be snap fit to the hooked projections 54. The hooked projections 54 can be formed integrally with the lower portion 16 by, for example, extruding the lower portion 16 to include the hooked projections 54. Similarly, the projections 56 can be formed integrally with the lens 14 by, for example, extruding the lens 14 to include the projections 56. The hooked projections 54 and projections 56 can extend the longitudinal lengths of the lower portion 16 and the lens 14, respectively, although a number of discrete hooked projections 54 and/or projections 56 could be used to couple the lens 14 to the lower portion 16. Alternatively, the lower portion 16 could be otherwise configured for attachment with the lens 14. For example, the lens 14 could be clipped, adhered, snap- or friction-fit, screwed or otherwise attached to the lower portion 16.

Alternatively to the illustrated housing 12, the housing 12 can include a light transmitting tube at least partially defined by the lens 14. The lens 14 can be made from polycarbonate, acrylic, glass or other light transmitting material (i.e., the lens 14 can be transparent or translucent). The term "lens" as used herein means a light transmitting structure, and not necessarily a structure for concentrating or diverging light.

The LED-based light 10 can include features for distributing the light produced by the LEDs 34 to, for example, emulate in full or in part the uniform light distribution of a conventional fluorescent light. For instance, the lens 14 can be manufactured to include light diffusing structures, such as ridges, dots, bumps, dimples or other uneven surfaces formed on an interior or exterior of the lens 14. The light diffusing structures can be formed integrally with the lens 14, for example, by molding or extruding, or the structures can be formed in a separate manufacturing step such as surface roughening. Alternatively, the material from which the lens 14 is formed can include light refracting particles. For example, the lens 14 can be made from a composite, such as polycarbonate, with particles of a light refracting material interspersed in the polycarbonate. In addition to or as an alternative to these light diffusing structures, a light diffusing film can be applied to the exterior of the lens 14 or placed in the housing 12.

The LED-based light 10 can include other features for distributing light produced by the LEDs 34. For example, the lens 14 can be manufactured with structures to collimate light produced by the LEDs 34. The light collimating structures can be formed integrally with the lens 14, for example, or can be formed in a separate manufacturing step. In addition to or as an alternative to manufacturing the lens 14 to include light collimating structures, a light collimating film can be applied to the exterior of the lens 14 or placed in the housing 12.

In yet other embodiments, the LEDs 34 can be over molded or otherwise encapsulated with light transmitting material configured to distribute light produced by the LEDs 34. For example, the light transmitting material can be configured to diffuse, refract, collimate and/or otherwise distribute the light produced by the LEDs 34. The over molded LEDs 34 can be used alone to achieve a desired light distribution for the LED-based light 10, or can be implemented in combination with the lens 14 and/or films described above.

The above described or other light distributing features can be implemented uniformly or non-uniformly along a length and/or circumference of the LED-based light 10. These features are provided as non-limiting examples, and in other embodiments, the LED-based light 10 may not include any light distributing features.

The LED circuit board 30 can include at least one LED 34, a plurality of series-connected or parallel-connected LEDs 34, an array of LEDs 34 or any other arrangement of LEDs 34. Each of the illustrated LEDs 34 can include a single diode or multiple diodes, such as a package of diodes producing light that appears to an ordinary observer as coming from a single source. The LEDs 34 can be surface-mount devices of a type available from Nichia, although other types of LEDs can alternatively be used. For example, the LED-based light 10 can include high-brightness semiconductor LEDs, organic light emitting diodes (OLEDs), semiconductor dies that produce light in response to current, light emitting polymers, electro-luminescent strips (EL) or the like. The LEDs 34 can emit white light. However, LEDs that emit blue light, ultra-violet light or other wavelengths of light can be used in place of or in combination with white light emitting LEDs 34.

The orientation, number and spacing of the LEDs 34 can be a function of a length of the LED-based light 10, a desired lumen output of the LED-based light 10, the wattage of the LEDs 34, a desired light distribution for the LED-based light 10 and/or the viewing angle of the LEDs 34.

The LEDs 34 can be fixedly or variably oriented in the LED-based light 10 for facing or partially facing an environment to be illuminated when the LED-based light 10 is installed in a light fixture. Alternatively, the LEDs 34 can be oriented to partially or fully face away from the environment to be illuminated. In this alternative example, the LED-based light 10 and/or a light fixture for the LED-based light 10 may include features for reflecting or otherwise redirecting the light produced by the LEDs into the environment to be illuminated.

For a 48" LED-based light 10, the number of LEDs 34 may vary from about thirty to three hundred such that the LED-based light 10 outputs between 1,500 and 3,000 lumens. However, a different number of LEDs 34 can alternatively be used, and the LED-based light 10 can output any other amount of lumens.

The LEDs 34 can be arranged in a single longitudinally extending row along a central portion of the LED circuit board 30 as shown, or can be arranged in a plurality of rows or arranged in groups. The LEDs 34 can be spaced along the LED circuit board 30 and arranged on the LED circuit board 30 to substantially fill a space along a length of the lens 14 between end caps 20 positioned at opposing longitudinal ends of the housing 12. The spacing of the LEDs 34 can be determined based on, for example, the light distribution of each LED 34 and the number of LEDs 34. The spacing of the LEDs 34 can be chosen so that light output by the LEDs 34 is uniform or non-uniform along a length of the lens 14. In one implementation, one or more additional LEDs 34 can be located at one or both ends of the LED-based light 10 so that an intensity of light output at the lens 14 is relatively greater at the one or more ends of the LED-based light 10. Alternatively, or in addition to spacing the LEDs 34 as described above, the LEDs 34 nearer one or both ends of the LED-based light 10 can be configured to output relatively more light than the other LEDs 34. For instance, LEDs 34 nearer one or both ends of the LED-based light 10 can have a higher light output capacity and/or can be provided with more power during operation.

The LED-based light 10 may be configured for permitting individual control over the operating states of the LEDs 34. For example, different LEDs 34 of the LED-based light 10 may be assigned with different respective logical control addresses. According to a non-limiting example indicated in FIG. 1, for instance, different logical control addresses may be assigned among the LEDs 34A, B, C, D, E, etc. With the LEDs 34 of the LED-based light 10 assigned with different logical control addresses, individual control can be exercised over the operating states of those of the LEDs 34 assigned with a respective logical control address.

In the examples that follow, each of the LEDs 34 of the LED-based light 10 is assigned with a logical control address. However, it will be understood that, consistently with these examples, some of the LEDs 34 of the LED-based light 10 need not be assigned with a logical control address. Such LEDs 34, if any, may be controlled in a conventional manner.

According to one non-limiting example of the LED-based light 10, each of the LEDs 34A, 34B, 34C, 34D, 34E, etc. of the LED-based light 10 may be assigned with a respective logical control address. In other examples of the LED-based light 10, one, some or all of the different logical control addresses could be assigned to a group of multiple of the LEDs 34. For example, some of the LEDs 34 may be grouped for assignment with a single logical control address according to the location of the LEDs 34 with respect to one another or with respect to the LED-based light 10, differences between the configurations of the LEDs 34, or both. For instance, one or more groups of LEDs 34 assigned with respective logical control addresses can correspond to zones of the LED-based light 10 and/or to sequential patterns within the LEDs 34 of the LED-based light 10. Moreover, one or more groups of LEDs 34 assigned with respective logical control addresses can additionally or alternatively correspond to the properties of the light emitted from the LEDs 34 or of the light emanating from the LED-based light 10 upon operation of the LEDs 34. In these or other examples of the LED-based light 10, a group of LEDs 34 assigned with a logical control address may, for instance, be or include two or more adjacent or non-adjacent LEDs 34.

The power supply circuit board 32 can be positioned within the housing 12 adjacent the electrical connector 18. The power supply circuit board 32 can also be positioned in other suitable locations (e.g., external to the LED-based light 10, within one or both of the end caps 20, etc.). The power supply circuit board 32 has power supply circuitry configured to condition an input power received from, for example, the light fixture through the electrical connector 18, to a power usable by and suitable for the LEDs 34. In some implementations, the power supply circuit board 32 can include one or more of an inrush protection circuit, a surge suppressor circuit, a noise filter circuit, a rectifier circuit, a main filter circuit, a current regulator circuit and a shunt voltage regulator circuit. The power supply circuit board 32 can be suitably designed to receive a wide range of currents and/or voltages from a power source and convert them to a power usable by the LEDs 34.

The LED-based light 10 may require a number of electrical connections to convey power between the various illustrated spatially distributed electrical assemblies included in the LED-based light 10, such as the LED circuit board 30, the power supply circuit board 32 and the electrical connector 18. These connections can be made using a circuit connector header 40 and a pin connector header 42, as shown in FIG. 2. In particular, when the LED-based light 10 is assembled, the circuit connector header 40 may be arranged to electrically couple the LED circuit board 30 to the power supply circuit board 32, and the pin connector header 42 may be arranged to electrically couple the power supply circuit board 32 to the pins 22 of an end cap 20.

As shown, the LED circuit board 30 and the power supply circuit board 32 are vertically opposed and spaced with respect to one another within the housing 12. The LED circuit board 30 and the power supply circuit board 32 can extend a length or a partial length of the housing 12, and the LED circuit board 30 can have a length different from a length of the power supply circuit board 32. For example, the LED circuit board 30 can generally extend a substantial length of the housing 12, and the power supply circuit board 32 can extend a partial length of the housing. However, it will be understood that the LED circuit board 30 and/or the power supply circuit board 32 could be alternatively arranged within the housing 12, and that the LED circuit board 30 and the power supply circuit board 32 could be alternatively spaced and/or sized with respect to one another.

The LED circuit board 30 and the power supply circuit board 32 are illustrated as elongate printed circuit boards. Multiple circuit board sections can be joined by bridge connectors to create the LED circuit board 30 and/or power supply circuit board 32. Also, other types of circuit boards may be used, such as a metal core circuit board. Further, the components of the LED circuit board 30 and the power supply circuit board 32 could be in a single circuit board or more than two circuit boards.

In the LED-based light 10, the operating states of the LEDs 34 assigned with each logical control address can be controlled individually from the operating states of the LEDs 34 assigned with other logical control addresses. For example, each of the one or more LEDs 34 assigned with a given logical control address can be selectively driven to an OFF state, where the LEDs 34 do not emit light, or to an ON state. The LEDs 34 may be driven in the ON state to emit light at a full operational intensity, for example. The full operational intensity of light can correspond to the absolute light output capacity for the LEDs 34, for instance, or to the light output capacity for the LEDs 34 under nominal operating conditions. Optionally, in the ON state, the LEDs 34 may be driven to emit light at one or more intermediate intensities. The LEDs 34 according to these examples may also, for example, be intermittently driven between an OFF state and an ON state.

Figure 3:
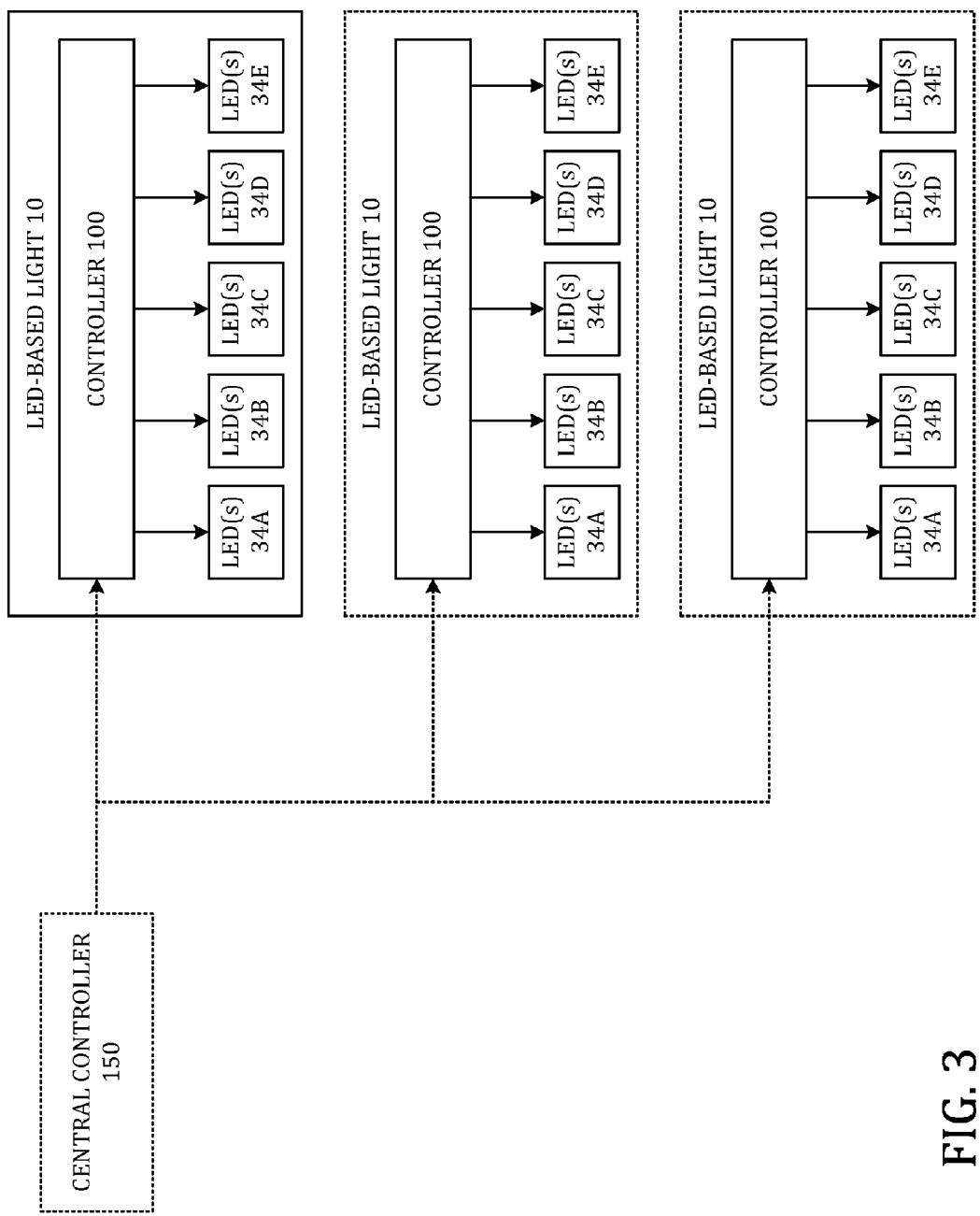
FIG. 3 is a schematic block diagram depicting examples of architectures for controlling the operation of one or more of the LED-based lights of FIG. 1.
Figure 4:
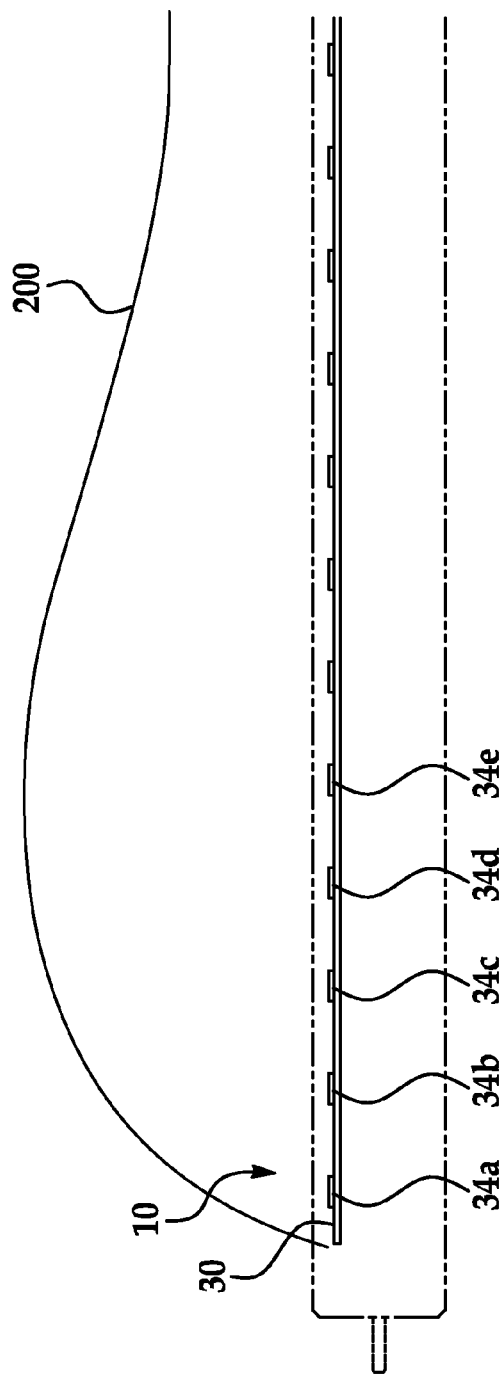
FIG. 4 is one representative example of the LED-based light where individually addressed LEDs are controlled to emit light at different intensities.

One or more controllers may be provided in communication with the LEDs 34 for controlling the operating states of the LEDs 34 assigned with each logical control address. As shown in FIG. 3, for instance, the LED-based light 10 may include a controller 100 in communication with the LEDs 34A, 34B, 34C, 34D, 34E, etc. In one implementation of the LED-based light 10, the controller 100 may be configured to generate respective control signals for controlling the operating states of the LEDs 34 assigned with each logical control address. In an alternative implementation including multiple of the LED-based lights 10, respective controllers 100 may act as slaves to a central controller 150 configured to generate control signals to coordinate the operations of the LED-based lights 10.

The ability to control the operating states of the LEDs 34 assigned with a logical control address individually from the operating states of the LEDs 34 assigned with other logical control addresses creates the opportunity to generate a variety of different lighting outcomes with the LED-based light 10. Differences between lighting outcomes can be defined, for example, with respect to the spatial, spectral and/or temporal aspects of the light emanating from the LED-based light 10 upon operation of the LEDs 34. Differences between lighting outcomes can be generated with examples of the LED-based light 10 where each of the LEDs 34 are similarly configured, or where there are variations among the configurations of the LEDs 34. Optionally, in furtherance of creating the opportunity to generate a variety of different lighting outcomes, the LED-based light 10 may incorporate optical structures to alter the properties of the light emitted from one, some or all of the LEDs 34, or of the light emanating from the LED-based light 10 upon operation of the LEDs 34.

FIGS. 4-8 depict specific non-limiting examples of LED-based lights 10 configured, implemented and/or controlled according to the foregoing general description.

In some example implementations of the LED-based light 10, differences between lighting outcomes can be generated in whole or in part through the selective and individual control over the intensity of light emitted from the LEDs 34.

The LEDs 34, for example, may be selectively driven to vary the intensity of light emanating along the length of the LED-based light 10. For instance, the LEDs 34 along one half of the LED-based light 10 could be driven in an ON state to emit light, and the LEDs 34 along the other half of the LED-based light 10 could be driven in an OFF state, resulting in light being emanating from only half of the LED-based light 10.

The LEDs 34 may also, for instance, be selectively driven to generate different gradients of light emanating from the LED-based light 10 upon operation of the LEDs 34. In the example according to FIG. 4, each of the LEDs 34 is driven in an ON state to emit light, with the LEDs 34 nearer the ends of the LED-based light 10 (only one end is shown) emitting light at a relatively higher intensity than the remaining LEDs 34 toward a center of the LED-based light 10. As shown, a resulting gradient of light 200 emanating from the LED-based light 10 is generally dog boned shaped in a plane including the axes of the LEDs 34. The dog bone shaped gradient of light 200 could be useful, for instance, in a lighting application where the LED-based light 10 is installed across an aisle and it is desirable not only to illuminate the aisle generally but also to wash the walls of the aisle with light. In other implementations, multiple LED-based lights 10 could be installed across a larger aisle, and the operations of the multiple of the LED-based lights 10 could be coordinated to generate the dog bone shaped gradient of light 200. This implementation could be useful, for instance, in a parking garage in order to provide relatively more light along the sides of the aisles above parked cars, and relatively less light along a main passageway receiving light from the headlamps of passing cars. Although the dog bone shaped gradient of light 200 is depicted and described in accordance with certain non-limiting examples, it will be understood that other implementations of one or more LED-based lights 10 could be used, and other control schemes could be applied, to support the generation of many other lighting outcomes exhibiting alternative gradients of light.

In some example implementations of the LED-based light 10, differences between lighting outcomes can be generated in whole or in part by exploiting variations among the configurations of the LEDs 34. Where the LED-based light 10 includes LEDs 34 with different configurations, it will be understood that multiple LEDs 34 with a common configuration could be assigned with respective logical control addresses, for example, or could be grouped for assignment with a single logical control address.

Figure 5:
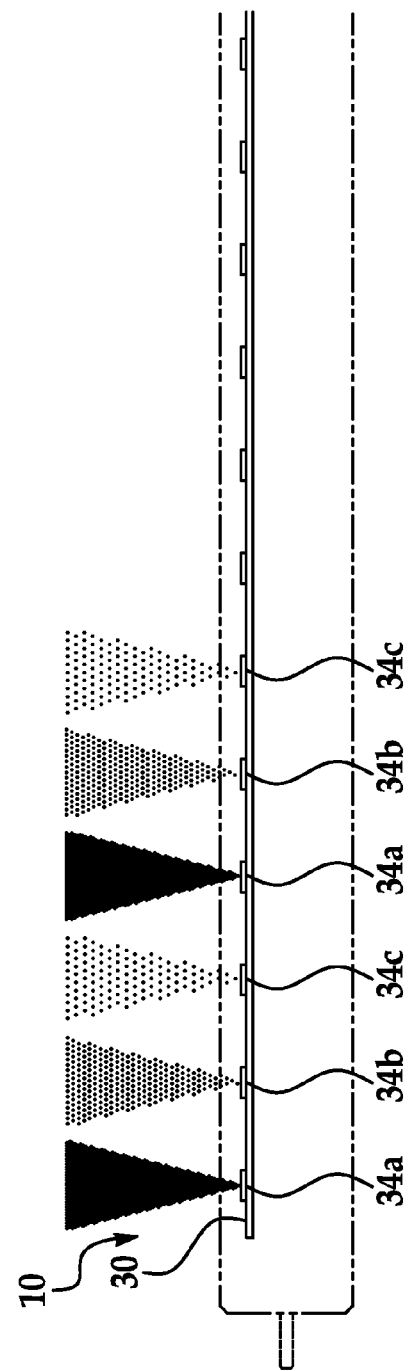
FIG. 5 is another representative example of the LED-based light where individually addressed LEDs are configured to emit light at different colors or color temperatures.

The LED-based light 10 of FIG. 5 includes one or more LEDs 34A, one or more LEDs 34B and one or more LEDs 34C, which as generally indicated are each configured to emit light with different properties. The differences among the properties could correspond to the color, the color temperature and/or any other properties of the emitted light. Where the differences among the properties corresponds in whole or in part to the color of the emitted light, it will be understood that the LEDs 34 could emit light of a same general color but at different respective hues (e.g., the LEDs 34A, 34B and LEDs 34C could emit different hues of white light).

In the example of the LED-based light 10 of FIG. 5, the LEDs 34A, 34B and 34C may be selectively driven to vary the color or the color temperature, for example, of the light emanating from the LED-based light 10. For instance, in one example implementation, one of the LEDs 34A, 34B or 34C may be selectively driven in an ON state to emit light, with the others of the LEDs 34A, 34B and 34C driven in an OFF state, to generate a lighting outcome where the LED-based light 10 emanates light according the properties of the LEDs 34A, 34B or 34C driven in an ON state. In other example implementations, any combination of the LEDs 34A, 34B and 34C may be selectively driven in an ON state to emit light to support the generation of many other lighting outcomes exhibiting different colors, color temperatures and/or other properties with respect to the light emanating from the LED-based light 10.

In some example implementations of the LED-based light 10, differences between lighting outcomes can be generated in whole or in part by outfitting the LED-based light 10 with optical structures to alter the properties of the light emitted from one, some or all of the LEDs 34, or of the light emanating from the LED-based light 10.

Figure 6:
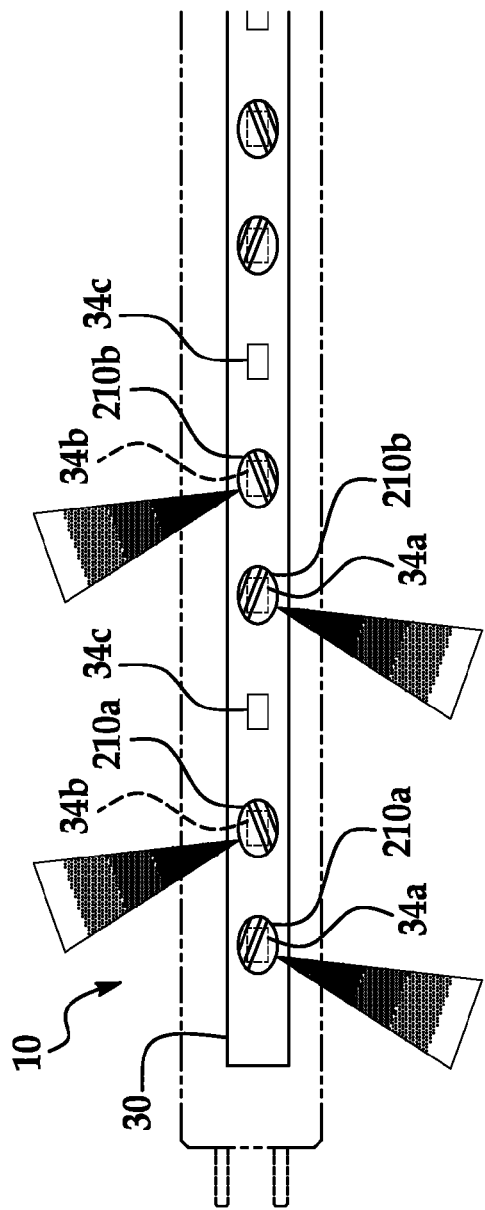
FIG. 6 is another representative example of the LED-based light where different optical structures are associated with respective of the individually addressed LEDs.
Figure 7:
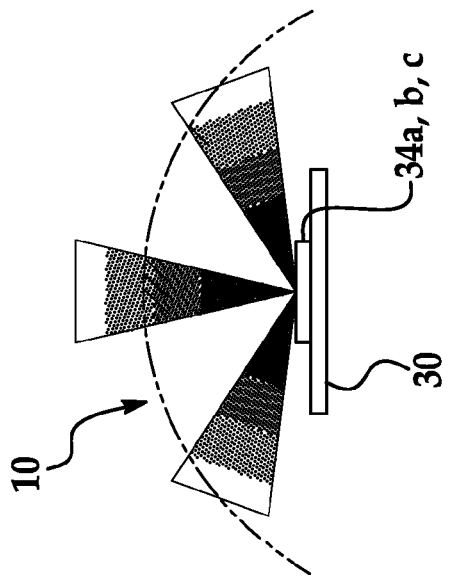
FIG. 7 is an end view of the LED-based light according to FIG. 6.

For instance, as shown in FIGS. 6 and 7, the LED-based light 10 may include optical structures 210A associated with one or more LEDs 34A and optical structures 210B associated with one or more LEDs 34B. Optionally, one or more LEDs 34C can operate without an optical structure altering the properties of the light emitted from the LEDs 34C. As generally indicated, the optical structures 210A are configured to direct light emitted from respective LEDs 34A in a first direction to the side of the LED-based light 10, while the optical structures 210B are configured to direct light emitted from respective LEDs 34B in a second direction to an opposing side of the LED-based light 10. Although the description follows with general reference to alteration of the spatial aspects of the light emitted from the LEDs 34A and 34B, it will be understood that the optical structures 210A and 210B could be additionally configured to modify, for instance, the spectral aspects of the emitted light.

As shown, each of the optical structures 210A and 210B is over-molded onto respective LEDs 34A and 34B, although the optical structures 210A and 210B could be otherwise arranged within the LED-based light 10, either as standalone structures or incorporated into another structure of the LED-based light 10, such as the lens 12. In a non-limiting example, each of the optical structures 210A and 210B could be, or include, a lens, for instance. In another non-limiting example, each of the optical structures 210A and 210B could be, or include, a light pipe, for instance. According to these or other examples, an optical structure 210A or 210B could alternatively be associated with more than one respective LED 34A or 34B. It will be understood that multiple LEDs 34 associated with a common type of optical structure, or multiple LEDS 34 not associated with an optical structure, could be assigned with respective logical control addresses, for example, or could be grouped for assignment with a single logical control address.

In example implementations of the LED-based light 10 according to FIGS. 6 and 7, one or more of the LEDs 34A, 34B and 34C may be selectively driven in an ON state to emit light to generate lighting outcomes where the LED-based light 10 emanates light in on or more of the first direction to one side of the LED-based light 10, the second direction to an opposing side of the LED-based light 10 or radially from the LED-based light 10. The ability to selectively drive the LEDs 34A and/or LEDs 34B could be useful, for instance, in a lighting application where the LED-based light 10 is installed in a cove or other structure to wash a wall to the side of the LED-based light 10 with light.

It will be understood that the principles described with reference to the foregoing example implementations of the LED-based light 10 are not mutually exclusive. That is, an LED-based light 10 may embody any combination of variations among the configurations of the LEDs 34, optical structures to alter the properties of the light emitted from one, some or all of the LEDs 34, the ability to selectively and individually control the intensity of light emitted from the LEDs 34, and other features supporting the generation of a variety of different lighting outcomes.

Figure 8:
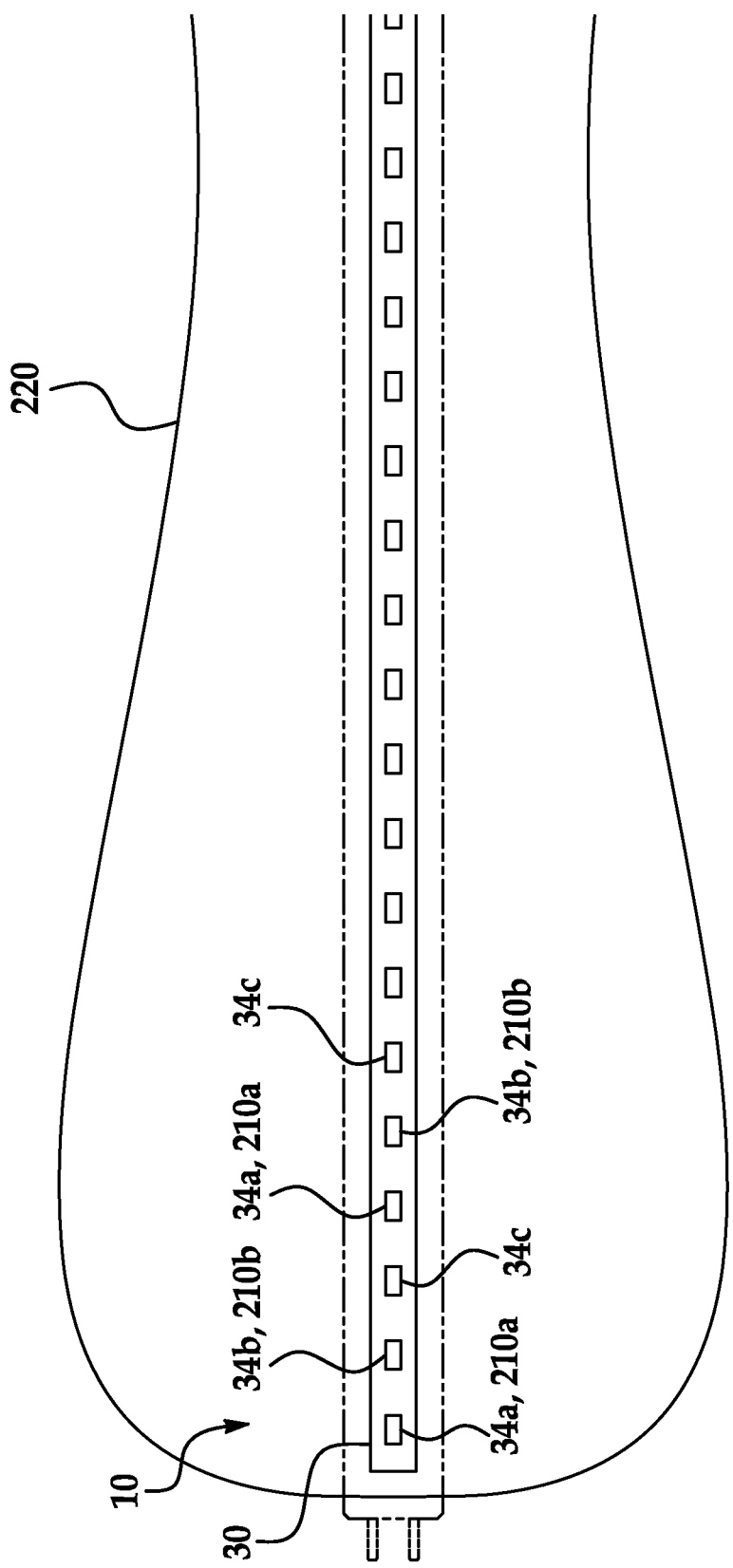
FIG. 8 is a representative example of the LED-based light according to FIG. 6 where the individually addressed LEDs are controlled to emit light at different intensities.

FIG. 8, for instance, depicts an implementation of the LED-based light 10 according to FIGS. 6 and 7 where the LEDs 34A and 34B, and optionally the LEDs 34C, are selectively driven in an ON state to emit light, and where in addition, the LEDs 34 nearer the ends of the LED-based light 10 (only one end is shown) are driven to emit light at a relatively higher intensity than the remaining LEDs 34 toward a center of the LED-based light 10. As shown, a resulting gradient of light 220 emanating from the LED-based light 10 is generally dog boned shaped in a plane normal to axes of the LEDs 34.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An LED-based replacement light, comprising:
multiple LEDs, the LEDs having different logical control addresses associated among them, with each logical control address subjecting one or more of the LEDs associated therewith to individual control, wherein the multiple LEDs comprise:
one or more first LEDs associated with a first logical control address, the LED-based replacement light being configured to emanate light emitted by the one or more first LEDs according to a first spatial distribution profile, and one or more second LEDs associated with a second logical control address different from the first logical control address, the LED-based replacement light being configured to emanate light emitted by the one or more second LEDs according to a second spatial distribution profile different from the first spatial distribution profile;

one or more first optical devices associated with the first logical control address and configured to distribute light emanating from the one or more first LEDs in a first way; and one or more second optical devices associated with the second logical control address and configured to distribute light emanating from the one or more second LEDs in a second way different from the first way;

a controller in communication with the LEDs, the controller configured to generate signals that individually control operating states of the one or more LEDs associated with each logical control address;

a housing for the LEDs; and a connector disposed at an end of the housing, the connector shaped for connection with a light socket.

2. The LED-based light of claim 1, wherein the generated signals individually control the operating states of the one or more LEDs associated with each logical control address in multiple combinations, each combination resulting in a different lighting outcome for the LED-based light.

3. The LED-based light of claim 1, wherein the generated signals individually control the one or more LEDs associated with each logical control address to one of an OFF state or an ON state.

4. The LED-based light of claim 1, wherein the generated signals individually control the one or more LEDs associated with each logical control address to one of an OFF state or one of a plurality of intensities in an ON state.

5. The LED-based light of claim 1, wherein each of the multiple LEDs is configured to emit the same color of light when controlled to an ON state.

6. The LED-based light of claim 1, wherein the one or more first LEDs are configured to emit light of a first color when controlled to an ON state, and
the one or more second LEDs are configured to emit light of a second color different from the first color when controlled to an ON state.

7. The LED-based light of claim 1, wherein the one or more first LEDs are configured to emit light of a first color temperature when controlled to an ON state, and
the one or more second LEDs are configured to emit light of a second color temperature different from the first color temperature when controlled to an ON state.

8. The LED-based light of claim 1, wherein each of the one or more first optical devices is configured to direct light in a first common direction, and wherein each of the one or more second optical devices is configured to direct light in a second common direction different than the first common direction.

9. The LED-based light of claim 1, wherein each of the one or more first optical devices comprises a respective first over mold configured to direct light in a first common direction, and wherein each of the one or more second optical devices comprises a respective second over mold configured to direct light in a second common direction different than the first common direction.

10. The LED-based light of claim 1, wherein each of the one or more first optical devices comprises a respective first lens configured to direct light in a first common direction, and wherein each of the one or more second optical devices comprises a respective second lens configured to direct light in a second common direction different than the first common direction.

11. The LED-based light of claim 1, wherein the one or more first LEDs are in optical communication with the one or more first optical devices, and not in optical communication with the one or more second optical devices, and
wherein the one or more second LEDs are in optical communication with the one or more second optical devices, and not in optical communication with the one or more first optical devices.

12. An LED-based replacement light, comprising:
one or more first LEDs, the one or more first LEDs associated with a first logical control address subjecting them to individual control, the LED-based replacement light being configured to emanate light emitted by the one or more first LEDs according to a first spatial distribution profile when the one or more first LEDs are controlled to an ON state;

one or more second LEDs, the one or more second LEDs associated with a second logical control address subjecting them to individual control, the LED-based replacement light being configured to emanate light emitted by the one or more second LEDs according to a second spatial distribution profile different from the first spatial distribution profile when the one or more second LEDs are controlled to an ON state, wherein the second logical control address is different from the first logical control address;

one or more first optical devices associated with the first logical control address and configured to distribute light emanating from the one or more first LEDs in a first way; and one or more second optical devices associated with the second logical control address and configured to distribute light emanating from the one or more second LEDs in a second way different from the first way;

a housing for the one or more first LEDs and the one or more second LEDs; and a connector disposed at an end of the housing, the connector shaped for connection with a light socket.

13. The LED-based light of claim 12, further comprising:
a controller in communication with the one or more first LEDs and the one or more second LEDs, the controller configured to generate signals that control the one or more first LEDs to an ON state and the one or more second LEDs to an OFF state to achieve the first spatial distribution profile.

14. The LED-based light of claim 12, further comprising:
a controller in communication with the one or more first LEDs and the one or more second LEDs, the controller configured to generate signals that control the one or more first LEDs to an OFF state and the one or more second LEDs to an ON state to achieve the second spatial distribution profile.

15. The LED-based light of claim 12, wherein the first spatial distribution profile is centered on an axis, and the second spatial distribution profile is off-center from the axis.

16. The LED-based light of claim 12, wherein the one or more first optical devices are over molds disposed on the one or more first LEDs.

17. The LED-based light of claim 12, wherein the one or more first optical devices are one or more lenses defined by the housing and opposing the one or more first LEDs.

18. The LED-based light of claim 12, wherein the one or more first LEDs and the one or more second LEDs are configured to emit the same color of light when controlled to an ON state.

19. An LED-based replacement light, comprising:
an elongate circuit board;
multiple LEDs mounted along the length of the circuit board, the LEDs having different logical control addresses associated among them, with each logical control address subjecting one or more LEDs associated therewith to individual control, wherein the multiple LEDs comprises:
one or more first LEDs associated with a first logical control address, the LED-based replacement light being configured to emanate light emitted by the one or more first LEDs according to a first spatial distribution profile, and
one or more second LEDs associated with a second logical control address different from the first logical control address, the LED-based replacement light being configured to emanate light emitted by the one or more second LEDs according to a second spatial distribution profile different from the first spatial distribution profile;
one or more first optical devices associated with the first logical control address and configured to distribute light emanating from the one or more first LEDs in a first way; and
one or more second optical devices associated with the second logical control address and configured to distribute light emanating from the one or more second LEDs in a second way different from the first way;
a controller in communication with the LEDs, the controller configured to generate signals that individually control operating states of the one or more LEDs associated with each logical control address;
an elongate housing for the circuit board and the LEDs; and
a pair of end caps disposed at opposing ends of the housing, each including a connector shaped for connection with a fluorescent light socket.

20. The LED-based light of claim 19, wherein:
the one or more first LEDs are positioned toward the middle of the LED-based light in a direction of its length, and the one or more second LEDs are positioned toward one or both of the ends of LED-based light in the direction of its length; and
the controller is configured to generate signals that control the one or more first LEDs to an ON state at a first intensity and the one or more second LEDs to an ON state at a second intensity higher than the first intensity, resulting in at least a partial dog-boned shaped lighting gradient from the LED-based light in a plane normal to the circuit board.

* * * * *